US006604806B1

(12) United States Patent
Yamada et al.

(10) Patent No.: US 6,604,806 B1
(45) Date of Patent: Aug. 12, 2003

(54) HIGH RESOLUTION PRINTING

(75) Inventors: Akitoshi Yamada, Irvine, CA (US);
Hiromitsu Hirabayashi, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/422,111

(22) Filed: Oct. 20, 1999

(51) Int. Cl.[7] ................................. B41J 2/205

(52) U.S. Cl. ................................. 347/15; 347/43

(58) Field of Search ................ 347/12, 15, 40, 347/41, 43, 14, 19; 358/298, 293, 300

(56) References Cited

U.S. PATENT DOCUMENTS

| 4,714,964 A | * | 12/1987 | Sasaki ................ 358/298 |
| 4,814,886 A | * | 3/1989 | Kuge et al. ........... 358/293 |
| 4,941,761 A | | 7/1990 | Ogawa et al. ......... 400/124 |
| 4,963,882 A | | 10/1990 | Hickman ............... 347/43 |
| 4,999,646 A | | 3/1991 | Trask .................. 347/43 |
| 5,012,257 A | | 4/1991 | Lowe et al. ........... 347/43 |
| 5,111,302 A | * | 5/1992 | Chan et al. ........... 358/454 |
| 5,270,728 A | | 12/1993 | Lund et al. ........... 347/43 |
| 5,349,375 A | | 9/1994 | Bolash et al. ......... 347/40 |
| 5,422,666 A | | 6/1995 | Koyama ................ 347/41 |
| 5,430,469 A | * | 7/1995 | Shioya et al. ......... 347/15 |
| 5,469,198 A | | 11/1995 | Kadonaga .............. 347/41 |
| 5,473,351 A | | 12/1995 | Helterline et al. ..... 347/19 |
| 5,500,661 A | * | 3/1996 | Matsubara et al. ..... 347/41 |
| 5,541,625 A | | 7/1996 | Holstun et al. ........ 347/5 |
| 5,555,006 A | | 9/1996 | Cleveland et al. ...... 347/41 |
| 5,583,550 A | | 12/1996 | Hickman et al. ........ 347/41 |
| 5,600,351 A | | 2/1997 | Holstun et al. ........ 347/40 |
| 5,608,821 A | * | 3/1997 | Metcalfe et al. ....... 358/252 |
| 5,621,453 A | | 4/1997 | Fujita et al. ......... 347/240 |
| 5,633,662 A | | 5/1997 | Allen et al. .......... 347/15 |
| 5,638,101 A | | 6/1997 | Keefe et al. .......... 347/65 |
| 5,640,183 A | | 6/1997 | Hackleman ............. 347/40 |
| 5,642,142 A | | 6/1997 | Bohorquez ............. 347/15 |
| 5,677,714 A | | 10/1997 | Klassen et al. ........ 347/9 |
| 5,677,716 A | | 10/1997 | Cleveland ............. 347/37 |
| 5,686,944 A | | 11/1997 | Takagi et al. ......... 347/41 |
| 5,719,601 A | | 2/1998 | Moore et al. .......... 347/9 |
| 5,726,690 A | | 3/1998 | Bohorquez et al. ...... 347/15 |
| 5,729,277 A | | 3/1998 | Morrison .............. 347/248 |
| 5,731,823 A | | 3/1998 | Miller et al. ......... 347/5 |
| 5,742,300 A | | 4/1998 | Klassen ............... 347/9 |
| 5,745,131 A | | 4/1998 | Kneezel et al. ........ 347/15 |
| 5,751,310 A | | 5/1998 | Yano et al. ........... 347/43 |
| 5,754,218 A | | 5/1998 | Baek et al. ........... 347/240 |
| 5,760,807 A | | 6/1998 | Yamazaki et al. ....... 347/103 |
| 5,764,254 A | | 6/1998 | Nicoloff, Jr. et al. .. 347/43 |
| 5,784,090 A | | 7/1998 | Selensky et al. ....... 347/102 |
| 5,805,178 A | | 9/1998 | Silverbrook ........... 347/15 |
| 5,818,474 A | | 10/1998 | Takahashi et al. ...... 347/15 |

(List continued on next page.)

FOREIGN PATENT DOCUMENTS

| EP | 837425 | 10/1997 |
| EP | 863479 | 3/1998 |
| EP | 916494 | 11/1998 |
| EP | 935213 | 2/1999 |
| JP | 09-015676 | 1/1997 |
| JP | 10-211736 | 8/1998 |

*Primary Examiner*—Lamson Nguyen
(74) *Attorney, Agent, or Firm*—Fitzpatrick, Cella, Harper & Scinto

(57) ABSTRACT

A recording system for printing a high resolution image. Low resolution print data is transferred from the host computer to the printer and expanded into high resolution print data in the printer, such as by using a predetermined pixel pattern or a pattern key. The pixel pattern is changed in each of the plurality of printing scans, such as by changing the scanning frequency, to eject additional ink droplets per pixel. An image process, such as an output correction process, is performed by the host computer to determine the pixel pattern and pattern key information for printing a high resolution image. Also, power required to be supplied to the print head is reduced by changing the pixel pattern.

57 Claims, 24 Drawing Sheets

U.S. PATENT DOCUMENTS

| | | | |
|---|---|---|---|
| 5,831,657 A | 11/1998 | Sakaue et al. | 347/131 |
| 5,870,112 A | 2/1999 | Kang et al. | 347/9 |
| 5,883,644 A | 3/1999 | Nicoloff, Jr. et al. | 347/12 |
| 5,889,537 A | 3/1999 | Shimada | 347/41 |
| 5,892,524 A | 4/1999 | Silverbrook | 347/15 |
| 5,900,891 A * | 5/1999 | Shimoda | 347/43 |
| 5,900,901 A | 5/1999 | Costanza et al. | 347/248 |
| 5,914,737 A | 6/1999 | Silverbrook | 347/48 |
| 6,193,347 B1 * | 2/2001 | Askeland et al. | 347/15 |
| 6,250,739 B1 * | 6/2001 | Serra | 347/43 |

* cited by examiner

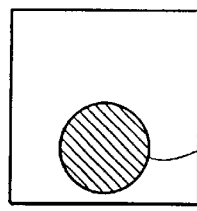
FIG. 13A
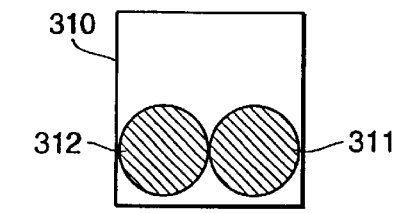
FIG. 13B
| | SCAN DATA | | KEY(SEP) | DIR | SHP |
|---|---|---|---|---|---|
| SCAN 1 | 1 | + | 1000 | F | 18 |
| SCAN 2 | 1 | + | 0110 | R | 18 |
| SCAN 3 | 1 | + | 1001 | F | 18 |
| SCAN 4 | 1 | + | 0110 | R | 18 |
FIG. 14A
| | EXPANDED DATA | INK DROPLETS |
|---|---|---|
| SCAN 1 | 1 0 / 0 0 | 400 |
| SCAN 2 | 0 1 / 1 0 | 401 |
| SCAN 3 | 1 0 / 0 1 | 402 |
| SCAN 4 | 0 1 / 1 0 | 403 |
FIG. 14B
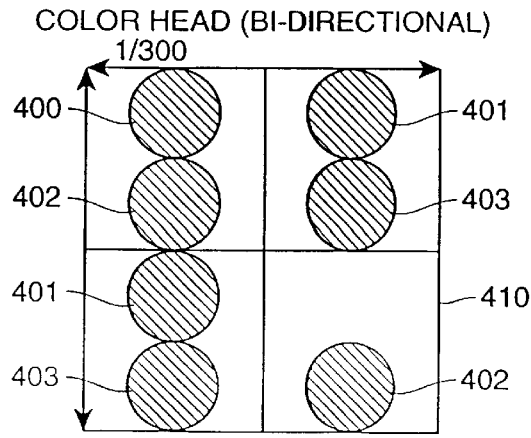
FIG. 14C

|  | SCAN DATA | KEY(SEP) | DIR | SHP |
|---|---|---|---|---|
| SCAN 1 | 1 | + 1 0 0 1 | F | 18 |
| SCAN 2 | 1 | + 0 1 1 1 | R | 36 |

|  | SCAN DATA | DIR | SHP | DROPLETS |
|---|---|---|---|---|
| SCAN 1 | 1 0 / 0 1 | F | 18 kHz | 501 |
| SCAN 2 | 0 1 / 1 1 | R | 36 kHz | 502 |

| 25 | 75 | 180 | 255 | ............................................. |
|----|----|-----|-----|-----|
| 25 | 75 | 180 | 255 | ............................................. |
| 0  | 35 | 120 | 255 | ............................................. |
| 0  | 35 | 120 | 255 | ............................................. |

FIG. 16A

| | | | | | |
|---|---|---|---|---|---|
| FWD 1 | 100 | 255 | 255 | 255 | ....................................... |
|  | 0 | 10 | 100 | 255 | ....................................... REV 2 |
| FWD 3 | 0 | 150 | 255 | 255 | ....................................... |
|  | 0 | 0 | 50 | 255 | ....................................... REV 4 |

FIG. 16B

HALFTONING PROCESS (EXAMPLE)

| | | | | | |
|---|---|---|---|---|---|
| FWD 1 | 0 | 1 | 1 | 1 | ....................................... |
|  | 0 | 0 | 0 | 1 | ....................................... REV 2 |
| FWD 3 | 0 | 0 | 1 | 1 | ....................................... |
|  | 0 | 0 | 0 | 1 | ....................................... REV 4 |

FIG. 16C

DATA SENT BY PRINTER DRIVER

| SCAN # | 300 dpi DATA | SEP | DIR | SHP |
|---|---|---|---|---|
| 1 | 0 1 1 1 | 1 0 0 1 | F | 18 |
| 2 | 0 0 0 1 | 0 1 1 1 | R | 36 |
| 3 | 0 0 1 1 | 1 0 0 1 | F | 18 |
| 4 | 0 0 0 1 | 0 1 1 1 | R | 36 |

DATA EXPANDED BY PRINTER

| SCAN # | 600 dpi DATA | DIR | SHP | INK DROPLETS |
|---|---|---|---|---|
| 1 | 0 0 1 0 1 0 1 0 / 0 0 0 1 0 1 0 1 | F | 18 | 610, 611, 612 |
| 2 | 0 0 0 0 0 0 0 1 / 0 0 0 0 0 0 1 1 | R | 36 | 613 |
| 3 | 0 0 0 0 1 0 1 0 / 0 0 0 0 0 1 0 1 | F | 18 | 614, 615 |
| 4 | 0 0 0 0 0 0 0 1 / 0 0 0 0 0 0 1 1 | R | 36 | 616 |

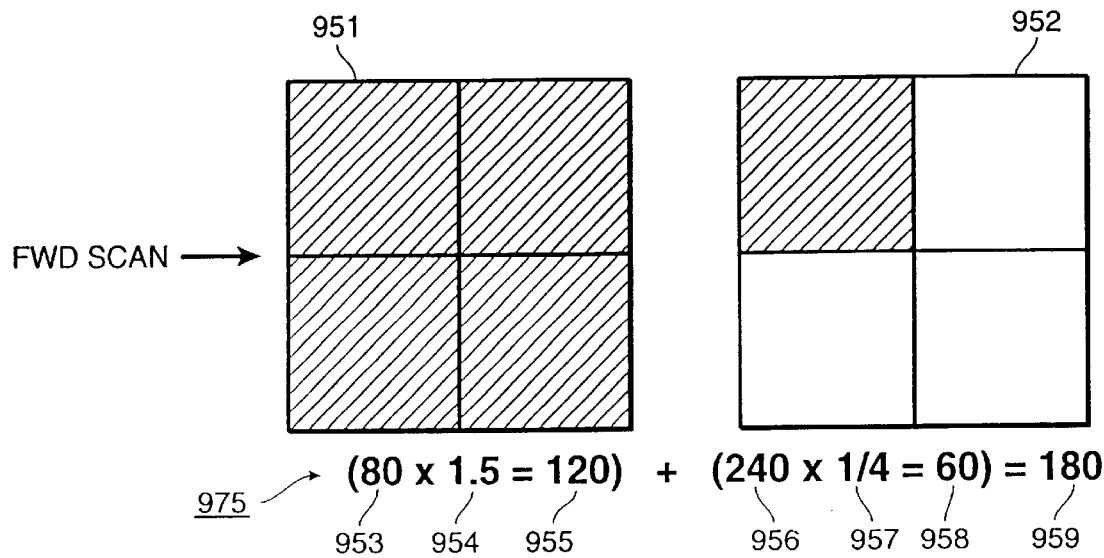
FIG. 21A
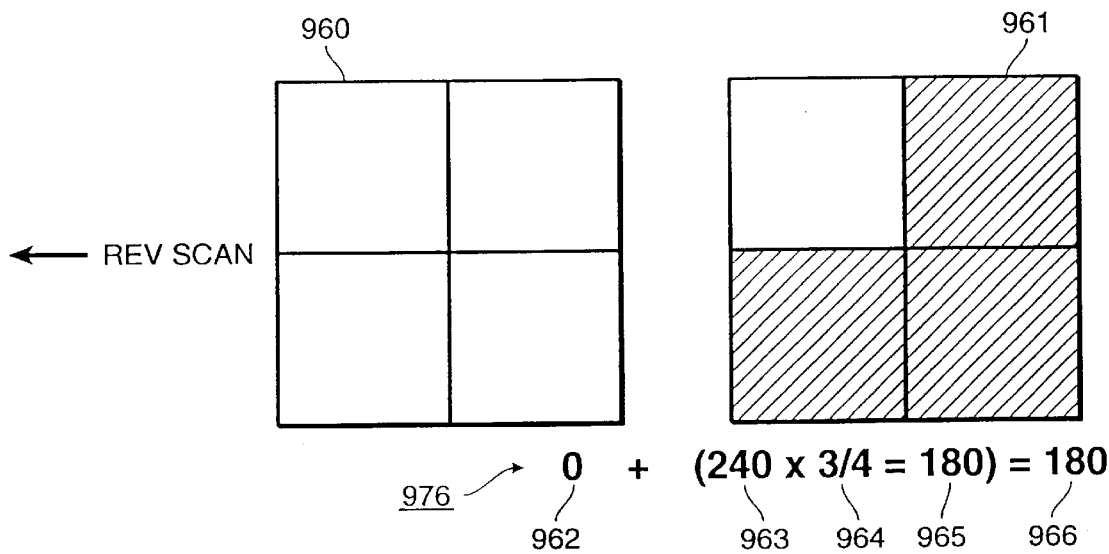
FIG. 21B
| INK | # OF NOZZLES | | | |
|---|---|---|---|---|
| K | 304 | 160 | 80 | 40 |
| C | 80 | 80 | 80 | 80 |
| M | 80 | 80 | 80 | 80 |
| Y | 80 | 80 | 80 | 80 |
FIG. 22

HIGH RESOLUTION PRINTING

BACKGROUND OF THE INVENTION

1. Field of the Invention

The present invention concerns high resolution printing by ink jet printers. More particularly, the present invention concerns high resolution printing wherein a printer expands low resolution print data to high resolution print data and prints out an image based on the high resolution print data. Additionally, the present invention concerns high resolution printing in which an ink volume applied to print each target is changed between a forward and a reverse printing scan by a print head.

2. Description of the Related Art

Ink jet printers generally print images on a recording medium by a print head ejecting ink droplets onto the recording medium based on print data received by the printer from a host computer. A user commences the printing process by selecting a print command from an application program stored in the host computer. When the user selects the print command, a print driver is activated that generally presents the user with various printing options. One such option is to select an image quality, such as a low or high resolution image.

Selection of one of these image quality options affects the time required for the printer to print the image. For instance, a high resolution image generally takes longer to print than a low resolution image because the print data sent from the host computer to the printer is generally twice or four times that of low resolution data. As a result, the printing speed is substantially reduced due to a slower data transfer.

One way to reduce the printing time required for high resolution images is to reduce the amount of data transferred from the host computer to the printer. In this regard, several methods have been proposed.

One such method is to transfer low resolution print data from the host computer to the printer and then have the printer enhance the image resolution before printout. According to this method, the printer generally enhances one pixel of 300 dpi resolution data to four pixels of 600 dpi resolution data. However, the resultant image quality is not as good as if the image were originally generated at 600 dpi.

Another method to reduce the amount of data transferred is known as indexing the print data. An example of a current indexing method is depicted in FIGS. 1A through 1C. As seen in FIG. 1A, current indexing methods utilize 2-bit information to indicate one of four printing patterns of 600 dpi per one pixel of 300 dpi. For example, the 2-bit data "00" indicates pattern 1100, 2-bit data "01" indicates pattern 1101, etc. This 2-bit information indicating one pixel of 300 dpi, as seen in FIG. 1B, is transferred from the host computer to the printer. The printer then expands the 2-bit, 300 dpi data into single bit 600 dpi data based on the 2-bit pattern information. As seen in FIG. 1C, pattern 1115 is the resultant expanded 600 dpi pattern representing the original 300 dpi pattern 1105.

This indexing method provides better image quality than merely enlarging one pixel of 300 dpi data to four pixels of 600 dpi data as previously mentioned. Additionally, the amount of data transferred from the host computer to the printer is reduced by half since only 2-bit 300 dpi data is required to be transferred rather than 4-bit 300 dpi data or single-bit 600 dpi data. However, because this indexing method requires 2-bit information to be transferred, the amount of data transferred is still twice the amount that would otherwise be required if a 1-bit information transfer method were to be employed.

Current ink jet printers are also limited in their ability to produce high resolution images due to their ink droplet ejection processes. In this regard, current ink jet printers eject ink droplets with a fixed pixel pattern in both a forward and a reverse scan of the print head. The fixed pixel pattern remains constant in both the forward and reverse scans. As a result, the number of ink droplets that can be ejected per pixel, and as a consequence the image quality, is limited by the pixel pattern. Therefore, what is needed is an ink jet printer that is able to change the ink droplet pixel pattern in order to eject more ink droplets per pixel and therefore enhance the image quality.

Additionally, current ink jet printers generally eject ink droplets at a constant frequency. That is, the number of ink droplets ejected per pixel generally remains constant in both the forward and reverse scans. Therefore, the number of ink droplets that can be ejected per pixel is limited by the frequency. As a result, the image quality is also limited by the frequency.

Therefore, what is needed is an ink jet printer with the ability to enhance the image quality by changing the ink ejection frequency in order to increase the number of ink droplets ejected per pixel.

Furthermore, current ink jet printers have power source concerns for printing high resolution images. Generally, when more power is required to be provided to the recording head, the print head and its driving circuit are required to have the capability of performing at the higher power, thus requiring additional resources that result in inefficiencies. In ink jet printers, the amount of power required to be supplied to the recording head is a function of several factors, including the printed pixel pattern. Because the printed pixel pattern is fixed in current ink jet printers, any desired reduction in the power required to be supplied to the recording head is limited by the pixel pattern. Accordingly, what is needed is a method of printing a high resolution image with a reduced power requirement.

SUMMARY OF THE INVENTION

According to one aspect, the present invention addresses the foregoing and achieves high resolution printing in situation where a printer expands low resolution print data received from a host computer into high resolution print data using a predetermined pixel pattern. According to this aspect of the invention, the predetermined pixel pattern is changed in each of a plurality of printing scans. Transferring low resolution data reduces the amount of data required to be transferred from the host computer to the printer and therefore the time required to print a high resolution image is reduced. Additionally, changing the predetermined pixel pattern enhances the image resolution because the host computer can select a pattern that differs from scan to scan and can tailor the pattern to produce better results in any one scan.

Accordingly, in one aspect the invention is a recording method wherein a printer prints an image on a recording medium by performing a plurality of printing scans. The method comprises the steps of transferring low resolution print data from a host computer to the printer, the printer expanding the low resolution print data to high resolution print data with a predetermined pixel pattern, and changing the predetermined pixel pattern in each of the plurality of printing scans.

As a result of the foregoing arrangement, a high resolution image is printed but the printing time is reduced. This is because the expansion process occurring in the printer allows low resolution scan data to be transferred from the host computer to the printer rather than requiring high resolution data to be transferred, thereby saving printing time in the data transfer process.

Additional data transfer advantages are achieved by the invention providing for pattern information to be transferred from the host computer to the printer, whereby the printer uses the pattern information in the data expansion process. The pattern information is determined by the host computer based on input densities of the image in order to provide for a high resolution image. Accordingly, the host computer determines which pattern is required for each scan line to obtain a high resolution image. Therefore, the printer merely uses the pattern information provided by the host computer to expand the data, thereby resulting in additional efficiency in the data expansion process.

The invention also provides for changing the pixel pattern after the expansion process, thereby further enhancing the image resolution. According to the invention, the pixel pattern is changed by changing the number of ink droplets ejected by the print head in a target pixel. The number of ink droplets ejected by the print head is increased by changing a scanning frequency of the print head in any particular scan. As a result, the additional ink droplets further enhance the image resolution.

According to this aspect, the present invention is a recording system for printing data on a recording medium by performing a plurality of printing scans by a print head capable of ejecting at least one color of ink. The system comprises a driving means for driving the print head, and a changing means for changing an image resolution printed by the print head in each of the plurality of printing scans. According to the invention, the recording system performs either multiple forward scans (uni-directional), or multiple forward and reverse printing scans (bi-directional), wherein the changing means changes the image resolution by changing the ink amount ejected by the print head to each target pixel between each scan. The ink amount is changed by either changing the pixel pattern between each scan, or changing the number of ink droplets printed within each target pixel by changing the scanning frequency of the print head.

As a result of the foregoing arrangement, the image resolution is enhanced by increasing the number of ink droplets ejected within each target pixel.

In yet another aspect, the invention achieves high resolution printing by providing a recording apparatus for printing data on a recording medium by performing a plurality of printing scans with a print head having ink ejection nozzles for ejecting ink of at least a first and a second color. The apparatus comprises a driving means for driving the print head across the recording medium and to eject at least the first color ink and/or the second color ink onto the recording medium, and a control means for causing the driving means to eject the first color ink in high resolution and the second color ink in low resolution in a first printing scan by the print head, and causing the driving means to eject the second color ink in high resolution in a second printing scan by the printing head.

As a result of the foregoing arrangement, a first color ink, such as black ink, can be ejected in high density on the first scan in combination with low density color, i.e. CMY, ink. The color ink, i.e. CMY, is then printed in high density in the second scan. Accordingly, a high resolution image can be produced in color, yet sufficient amounts of color ink can be efected so as to ensure a color image with high contrast.

According to yet another aspect, the present invention achieves high resolution printing by providing a recording method for printing data on a recording medium, wherein a host computer transfers data to a printer that prints the data by performing a plurality of printing scans with a print head that prints with at least one color. The method comprises the steps of the host computer generating scan data for each of the plurality of printing scans, and the host computer performing a first image process or a second image process to each of the generated scan data, wherein the scan data processed in one of the first or second image processes is printed in each of the plurality of printing scans of the print head.

According to the invention, the first and second image processes are an output correction process for generating output density values based on corresponding input density values so as to achieve an overall uniformity in print density regardless of print head direction. Alternatively, the first image process is a process for printing scan data in low resolution by the print head, and the second image process is a process for printing scan data in high resolution by the print head.

As a result of the foregoing, a pixel pattern for printing a high resolution image is obtained. The process obtains an output density and the required number of ink droplets to obtain the high resolution image. This data is used by the host computer to determine a pixel pattern for printing the high resolution image, which is then transferred from the host computer to the printer, whereby the printer prints the image.

In yet a further aspect, the invention achieves high resolution printing by providing a method for processing image data to be printed by a printer that prints an image on a recording medium by performing a plurality of printing scans. The method comprises the steps of generating scan data for printing the image, organizing the scan data into a first group of scan data comprising data to be printed with black ink, a second group of scan data comprising data to be printed with ink other than black ink and to be printed in a first scanning direction, and a third group of scan data comprising data to be printed with ink other than black ink and to be printed in a second scanning direction opposite the first scanning direction. The first, second, and third groups of scan data are therefore processed to obtain corrected scan data.

According to the invention, the generated scan data is input density data. Based on the input density data, the method processes the data to obtain an output density and the number of ink droplets required to be printed for a target pixel to obtain the required image resolution. As a result of the foregoing, a pixel pattern for printing a high resolution image is obtained, which is then transferred from the host computer to the printer, whereby the printer prints the image.

In yet further aspects, the invention is a computer-readable medium storing computer-executable process steps of the foregoing image process method as well as a print driver for performing the image process.

In yet a further aspect, the invention is a recording apparatus for printing data on a recording medium by performing a plurality of printing scans with a print head having ink ejection nozzles for ejecting ink of at least a first and a second color. The apparatus comprises driving means for driving the print head across the recording medium and to eject at least the first color ink and/or the second color ink onto the recording medium, and control means for causing the driving means to eject the first color ink with a first power and the second color ink with a second power in a first printing scan by the print head, and causing the driving means to eject the second color ink with a third power larger than the second power in a second printing scan by the printing head.

As a result of the foregoing arrangement, less power is used to print the high quality image. Therefore, the required print head and driving circuit capabilities can be reduced.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIGS. 13A and 13B depict the effect of changing the scan frequency according to the invention.

FIGS. 14A, 14B and 14C show an example of printout within one target pixel according to the invention for a high resolution print mode.

FIGS. 16A, 16B, and 16C show an example of the data binarization process of FIG. 9.

FIGS. 21A and 21B depict the power source requirements for printing two target pixels in one scan line according to the invention.

FIG. 22 is a table listing possible nozzle combinations for printing according to the invention.

DETAILED DESCRIPTION OF THE PREFERRED EMBODIMENTS

Figure 2:
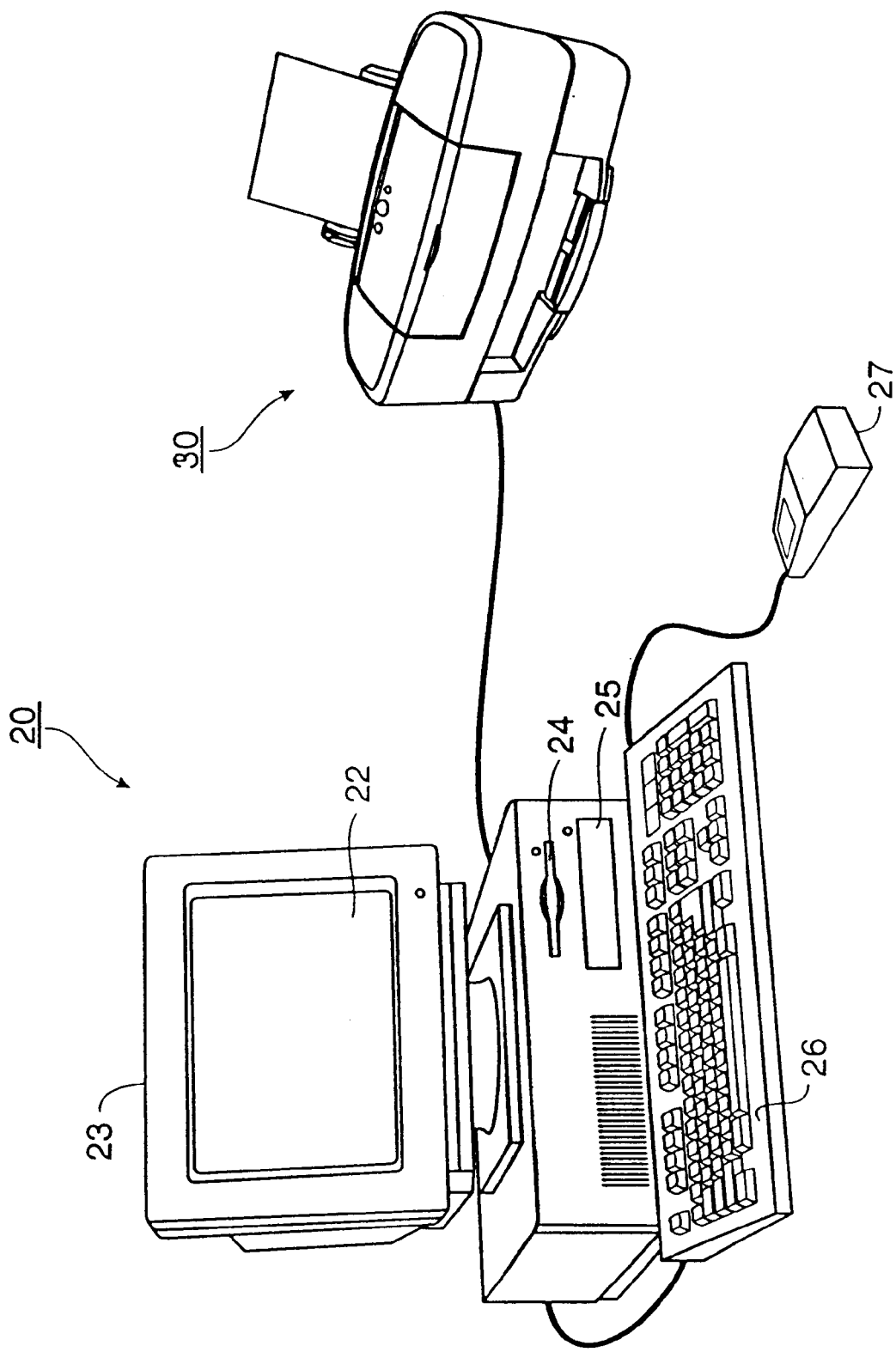
FIG. 2 shows a perspective view of computing equipment used in connection with the printer of the present invention.

FIG. 2 is a view showing the outward appearance of computing equipment used in connection with the invention described herein. Computing equipment 20 includes host processor 23. Host processor 23 comprises a personal computer (hereinafter "PC"), preferably an IBM PC-compatible computer having a windowing environment, such as Microsoft® Windows95. Provided with computing equipment 20 are display screen 22 comprising a color monitor or the like, keyboard 26 for entering text data and user commands, and pointing device 27. Pointing device 27 preferably comprises a mouse for pointing and for manipulating objects displayed on display screen 22.

Computing equipment 20 includes a computer-readable memory medium, such as fixed computer disk 25, and floppy disk interface 24. Floppy disk interface 24 provides a means whereby computing equipment 20 can access information, such as data, application programs, etc., stored on floppy disks. A similar CD-ROM interface (not shown) may be provided with computing equipment 20, through which computing equipment 20 can access information stored on CD-ROMS.

Disk 25 stores, among other things, application programs by which host processor 23 generates files, manipulates and stores those files on disk 25, presents data in those files to an operator via display screen 22, and prints data in those files via printer 30. Disk 25 also stores an operating system which, as noted above, is preferably a windowing operating system such as Windows95. Device drivers are also stored in disk 25. At least one of the device drivers comprises a print driver which provides a software interface to firmware in printer 30. Data exchange between host processor 23 and printer 30 is described in more detail below.

In preferred embodiments of the invention, printer 30 is a multi-head serial printer. Accordingly, although the inventions described herein are not limited to use with such a printer, the invention will be described in the context of such a printer.

Figure 3:
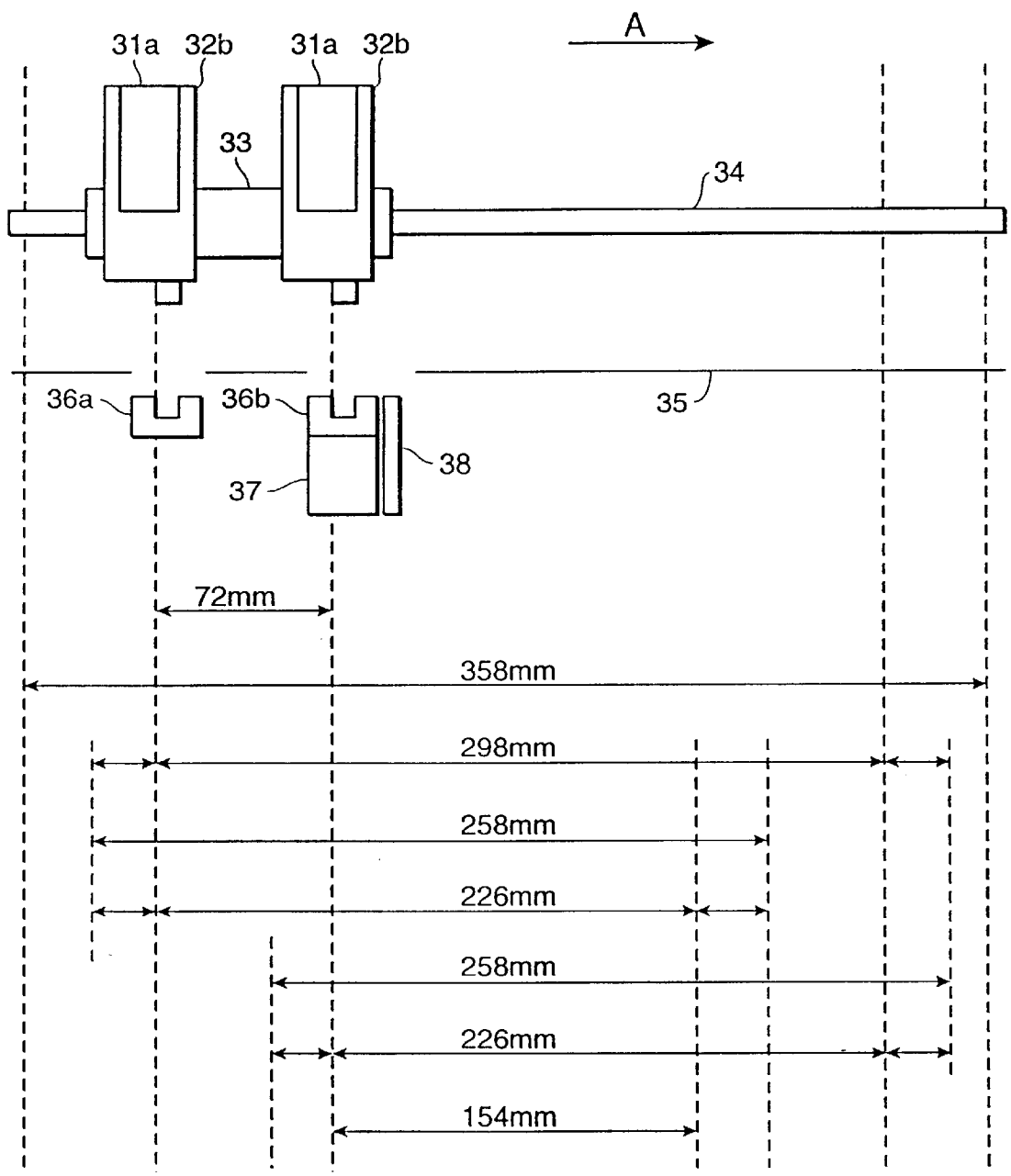
FIG. 3 is a schematic view of a dual head printer.

FIG. 3 is a schematic view of the arrangement of the dual print heads in printer 30. Each of print heads 31a and 31b are mounted on carriage 33 with a fixed separation such as 72 mm. Ink tanks 32a and 32b are respectively provided for each print head, and supply different colored inks such as cyan, magenta, yellow and black inks to their respective print head. Such an arrangement allows each tank in each printer head to be independently installed and removed from carriage 33.

Carriage 33 is supported for reciprocal back and forth sliding motion in the direction of arrow A on guide rail 34, and carriage 33 is driven across guide rail 34 by suitable driving means such as a belt or the like. The drive means drives carriage 33, and consequently print heads 31a and 31b, in scanning motions across guide rail 34 so as to scan across an unshown printing medium. With this arrangement, print head 31a scans in a left-side portion of the printing medium and has as its printable area a width of 226 mm; whereas print head 31b scans in the right-side portion of the printing medium, and has as its printing area a width of 226 mm.

Capping mechanisms 36a and 36b are respectively provided for the ink jet outlets of each of print heads 31a and 31b. The capping mechanisms 36a and 36b are disposed under platen 35 at the home position of carriage 33 so that each ink ejection nozzle can be capped when in the home position. In addition, capping mechanism 36b is additionally provided with pumping mechanism 37, so as to extract ink from the ink ejection nozzles by suction. Since either of print heads 31a or 31b may be positioned over capping mechanism 36b, it is ordinarily not necessary to provide a separate pumping mechanism 37 for both capping mechanisms.

Wiper 38 is provided adjacent capping mechanism 36b. Wiper 38 moves outward at certain times into the path of the print heads 31a and 31b so as to wipe the ink ejection nozzles of the head as they come in contact therewith.

With the above-described arrangement, a head separation distance of 72 mm between each of heads 31a and 31b corresponds to approximately ¼ of the maximum printable area, which in this case is 298 mm. A central overlap area of 154 mm can be printed on by either of the print heads 31a and 31b. With this arrangement, A-3 size paper (297 mm×420 mm) can be accommodated easily. In addition, A-5 size paper (148 mm by 210 mm) can also be accommodated easily in the central overlap section. In this case, it is possible to replace one of the two print heads 31a and 31b with a print head which uses different kinds of ink, such as a print head which uses ink of lesser density than that of the replaced print head. Such an arrangement provides the ability to print with a greater variety of inks such as is desired when printing near-photographic quality images on A-5 size paper.

Figure 4:
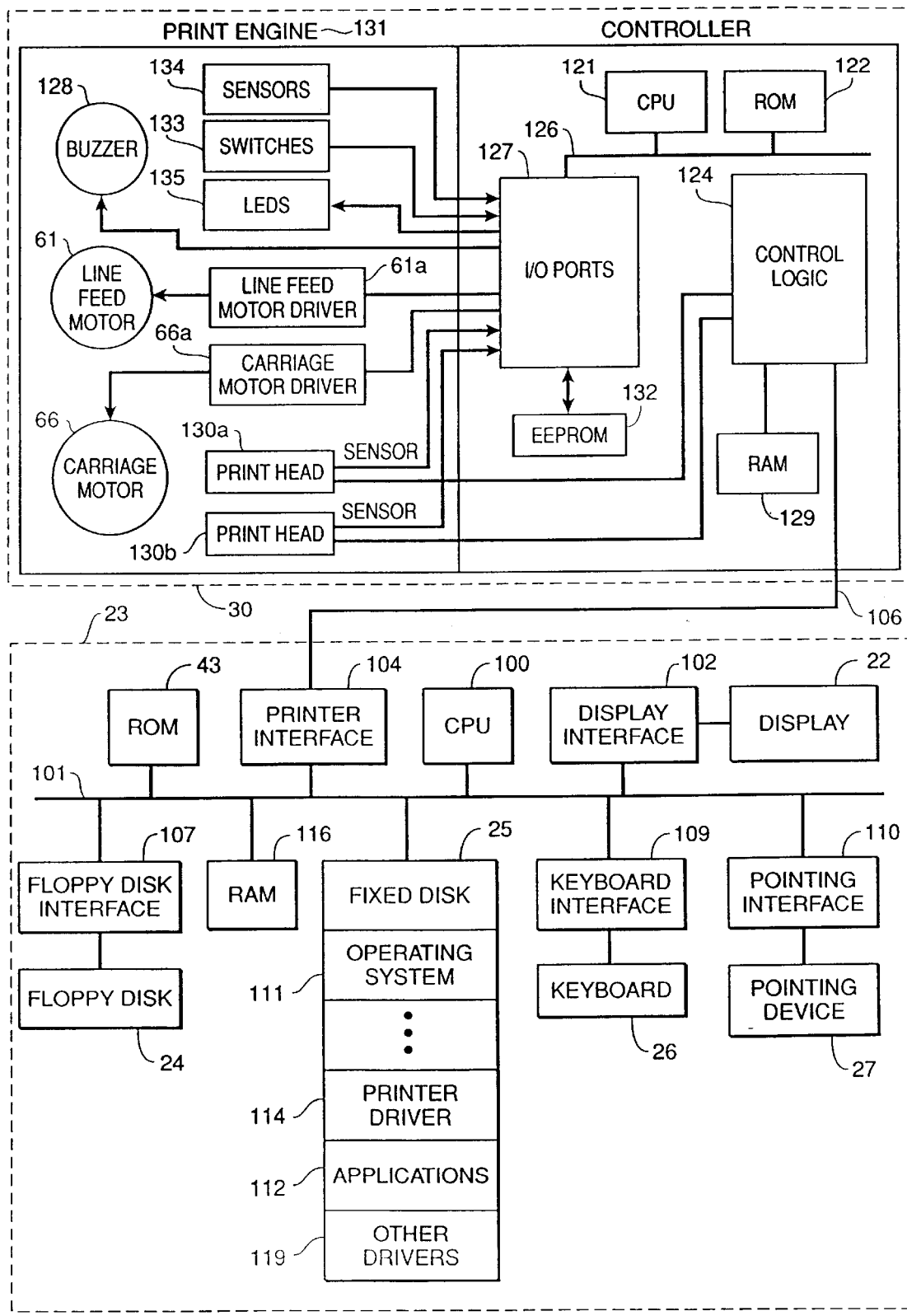
FIG. 4 is a block diagram showing the hardware configuration of a host processor interfaced to the printer of the present invention.

FIG. 4 is a block diagram showing the internal structures of host processor 23 and printer 30. In FIG. 4, host processor 23 includes a central processing unit 100 such as a programmable microprocessor interfaced to computer bus 101. Also coupled to computer bus 101 are display interface 102 for interfacing to display 22, printer interface 104 for interfacing to printer 30 through bi-directional communication line 106, floppy disk interface 107 for interfacing to floppy disk 24, keyboard interface 109 for interfacing to keyboard 26, and pointing device interface 110 for interfacing to pointing device 27. Disk 25 includes an operating system section for storing operating system 111, an applications section for storing applications 112, and a print driver section for storing print driver 114.

A random access main memory (hereinafter "RAM") 116 interfaces to computer bus 101 to provide CPU 100 with access to memory storage. In particular, when executing stored application program instruction sequences such as those associated with application programs stored in applications section 112 of disk 25, CPU 100 loads those application instruction sequences from disk 25 (or other storage media such as media accessed via a network or floppy disk drive 24) into random access memory (hereinafter "RAM") 116 and executes those stored program instruction sequences out of RAM 116. RAM 116 provides for a print data buffer used by print driver 114 according to the invention, as described more fully hereinbelow. It should also be recognized that standard disk-swapping techniques available under the windowing operating system allow segments of memory, including the aforementioned print data buffer, to be swapped on and off of disk 25. Read only memory (hereinafter "ROM") 43 in host processor 23 stores invariant instruction sequences, such as start-up instruction sequences or basic input/output operating system (BIOS) sequences for operation of keyboard 26.

As shown in FIG. 4, and as previously mentioned, disk 25 stores program instruction sequences for a windowing operating system and for various application programs such as graphics application programs, drawing application programs, desktop publishing application programs, and the like. In addition, disk 25 also stores color image. files such as might be displayed by display 22 or printed by printer 30 under control of a designated application program. Disk 25 also stores a color monitor driver in other drivers section 119 which controls how multi-level RGB color primary values are provided to display interface 102. Print driver 114 controls printer 30 for both black and color printing and supplies print data for print out according to the configuration of printer 30. Print data is transferred to printer 30, and control signals are exchanged between host processor 23 and printer 30, through printer interface 104 connected to line 106 under control of print driver 114. Other device drivers are also stored on disk 25, for providing appropriate signals to various devices, such as network devices, facsimile devices, and the like, connected to host processor 23.

Ordinarily, application programs and drivers stored on disk 25 need first to be installed by the user onto disk 25 from other computer-readable media on which those programs and drivers are initially stored. For example, it is customary for a user to purchase a floppy disk, or other computer-readable media such as CD-ROM, on which a copy of a print driver is stored. The user would then install the print driver onto disk 25 through well-known techniques by which the print driver is copied onto disk 25. At the same time, it is also possible for the user, via a modem interface (not shown) or via a network (not shown), to download a print driver, such as by downloading from a file server or from a computerized bulletin board.

Referring again to FIG. 4, printer 30 includes CPU 121 such as an 8-bit or a 16-bit microprocessor including programmable timer and interrupt controller, ROM 122, control logic 124, and I/O ports unit 127 connected to bus 126. Also connected to control logic 124 is RAM 129. Control logic 124 includes controllers for line feed motor 61, for print image buffer storage in RAM 129, for heat pulse generation, and for head data. Control logic 124 also provides control signals for nozzles in print heads 130a and 130b (corresponding to print heads 31a and 31b in FIG. 3) of print engine 131, carriage motor 66, line feed motor 61, and print data for print heads 130a and 130b, and receives information from print engine 131 for alignment of print heads 130a and 130b through I/O ports unit 127. EEPROM 132 is connected to I/O ports unit 127 to provide non-volatile memory for printer information such as print head configuration and print head alignment parameters. EEPROM 132 also stores parameters that identify the printer, the driver, the print heads, alignment of the print heads, the status of ink in the cartridges, etc., which are sent to print driver 114 of host processor 23 to inform host processor 23 of the operational parameters of printer 30.

I/O ports unit 127 is coupled to print engine 131 in which a pair of print heads 130a and 130b perform recording on a recording medium by scanning across the recording medium while printing using print data from a print buffer in RAM 129. Control logic 124 is also coupled to printer interface 104 of host processor 23 via communication line 106 for exchange of control signals and to receive print data and print data addresses. ROM 122 stores font data, program instruction sequences used to control printer 30, and other invariant data for printer operation. RAM 129 stores print data in a print buffer defined by print driver 114 for print heads 130a and 130b and other information for printer operation.

Print heads 130a and 130b of print engine 131 correspond to ink cartridges that are stored in cartridge receptacles (not shown) on carriage 33. Sensors, generally indicated as 134, are arranged in print engine 131 to detect printer status and to measure temperature and other quantities that affect printing. A photo sensor in the cartridge receptacles measures print density and dot locations for automatic alignment. Sensors 134 are also arranged in print engine 131 to detect other conditions such as the open or closed status of the printer access cover (not shown), presence of recording media, etc. In addition, diode sensors, including a thermistor, are located in print heads 130a and 130b to measure print head temperature, which is transmitted to I/O ports unit 127.

I/O ports unit 127 also receives input from switches 133 such as a power button and resume button (not shown) and delivers control signals to LEDs to light an indicator light, to a buzzer, and to line feed motor 61 and carriage motor 66 through line feed motor driver 61a and carriage motor driver 66a, respectively.

Although FIG. 4 shows individual components of printer 30 as separate and distinct from one another, it is preferable that some of the components be combined. For example, control logic 124 may be combined with I/O ports 127 in an ASIC to simplify interconnections for the functions of printer 30.

Figure 5:
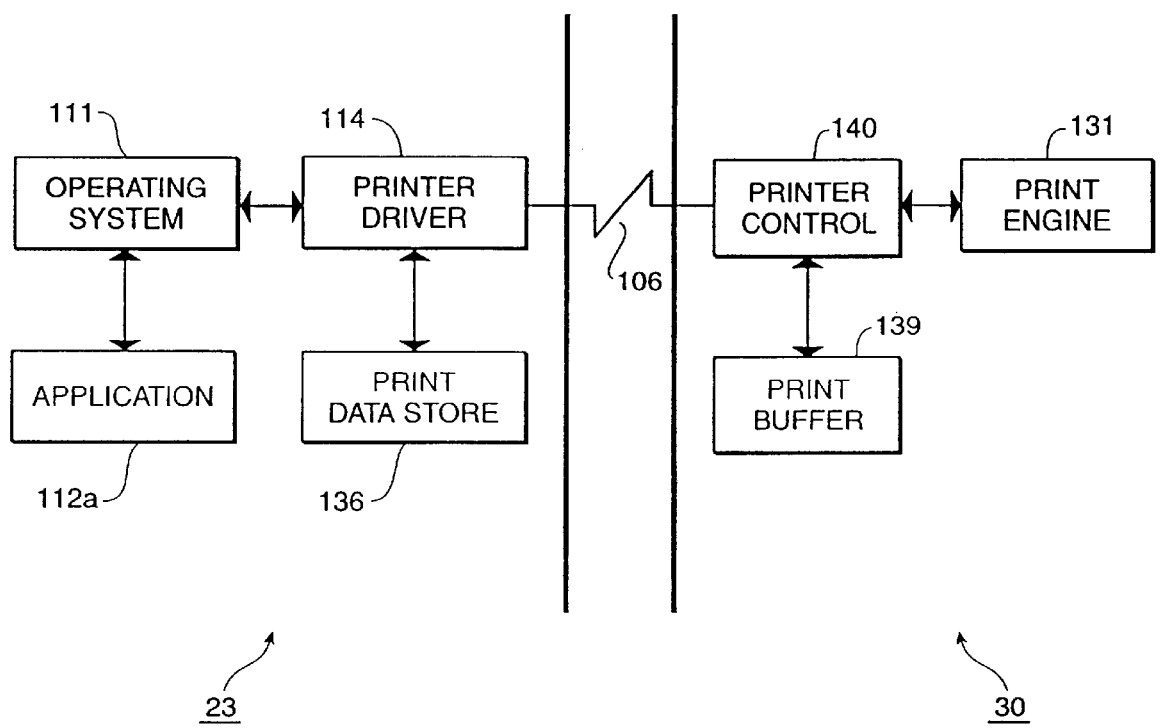
FIG. 5 shows a functional block diagram of the host processor and printer shown in FIG. 4.

FIG. 5 shows a high-level functional block diagram that illustrates the interaction between host processor 23 and printer 30. As illustrated in FIG. 5, when a print instruction is issued from image processing application program 112a stored in application section 112 of disk 25, operating system 111 issues graphics device interface calls to print driver 114. Print driver 114 responds by generating print data corresponding to the print instruction and stores the print data in print data store 136. Print data store 136 may reside in RAM 116 or in disk 25, or through disk swapping operations of operating system 111 may initially be stored in RAM 116 and swapped in and out of disk 25. Thereafter, print driver 114 obtains print data from print data store 136 and transmits the print data through printer interface 104, to bi-directional communication line 106, and to print buffer 139 through printer control 140. Print buffer 139 resides in RAM 129 and printer control 140 resides in control logic 124 and CPU 121 of FIG. 10. Printer control 140 processes the print data in print buffer 139 responsive to commands received from host processor 23 and performs printing tasks under control of instructions stored in ROM 122 (see FIG. 4) to provide appropriate print head and other control signals to print engine 131 for recording images onto recording media.

Print buffer 139 has a first section for storing print data to be printed by one of print heads 130a and 130b, and a second section for storing print data to be printed by the other one of print heads 130a and 130b. Each print buffer section has storage locations corresponding to the number of print positions of the associated print head. These storage locations are defined by print driver 114 according to a resolution selected for printing. Each print buffer section also includes additional storage locations for transfer of print data during ramp-up of print heads 130a and 130b to printing speed. Print data is transferred from print data store 136 in host processor 23 to storage locations of print buffer 139 that are addressed by print driver 114. As a result, print data for a next scan may be inserted into vacant storage locations in print buffer 139 both during ramp up and during printing of a current scan.

Figure 6:
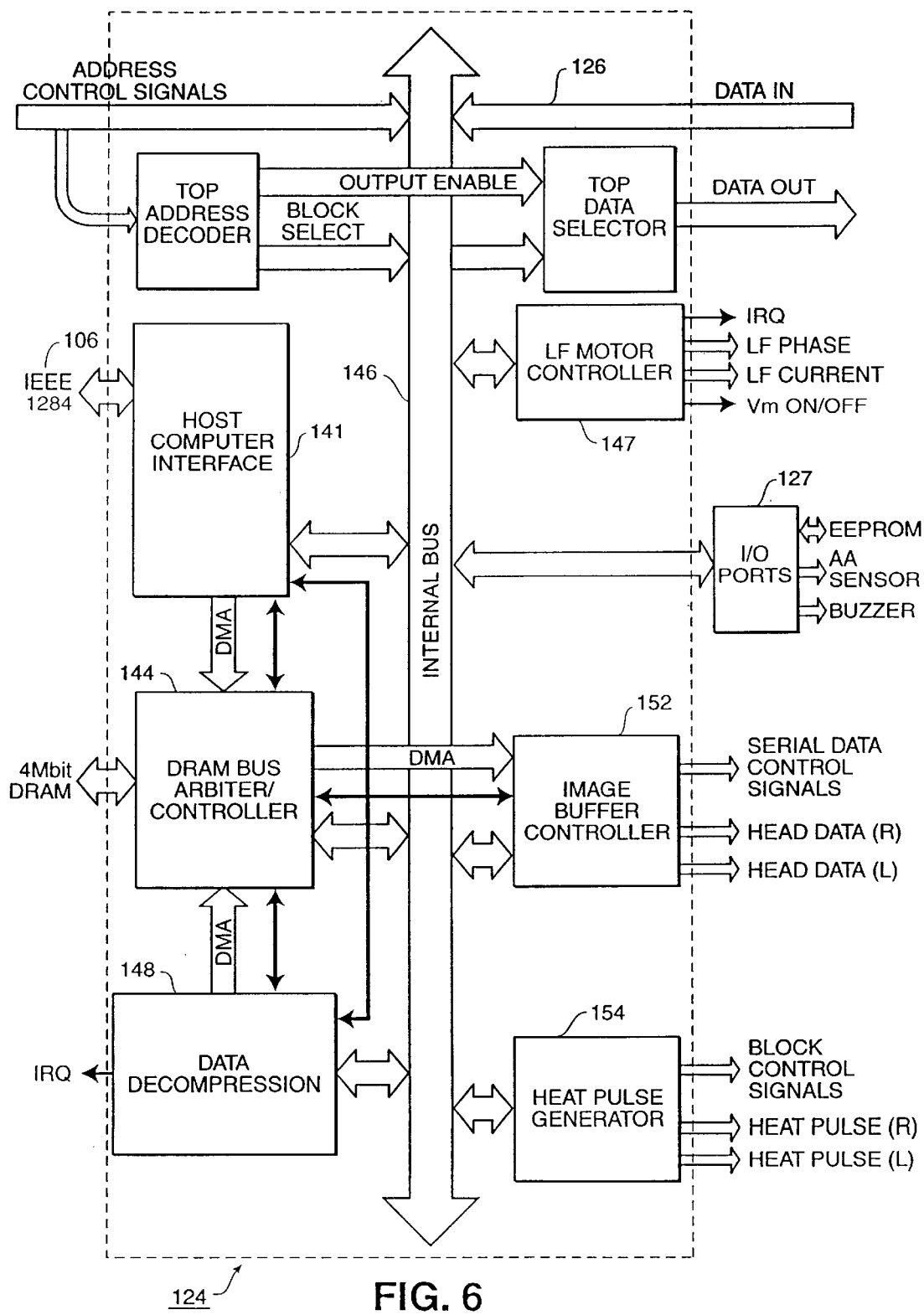
FIG. 6 is a block diagram of the printer control logic shown in FIG. 4.
Figure 10:
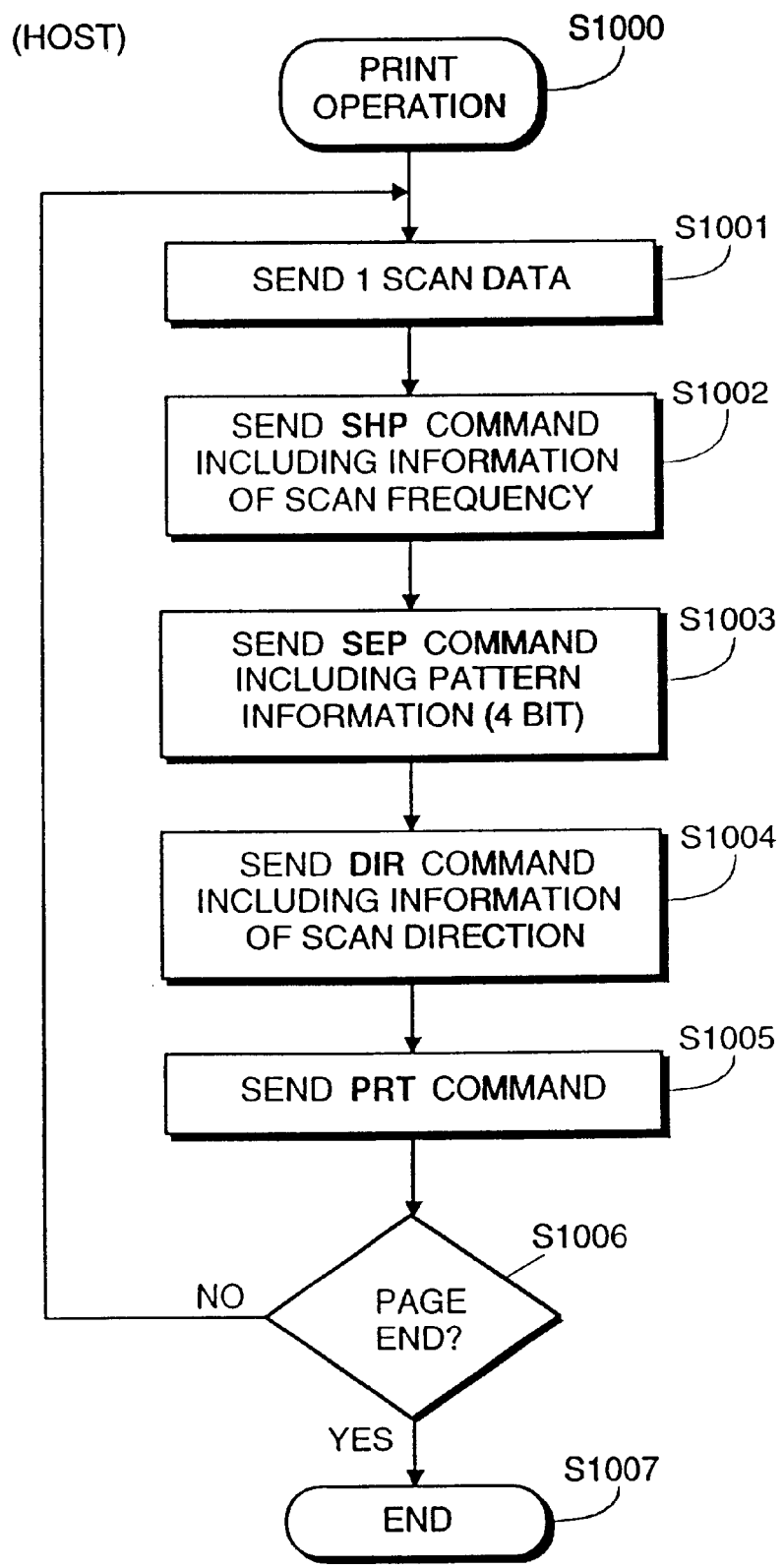
FIG. 10 is a flow diagram depicting the data and commands sent by the print driver to the printer in the present invention.

FIG. 6 depicts a block diagram of control logic 124 and I/O ports unit 127 from FIG. 10. As mentioned above, I/O ports unit may be, alternatively, included within control logic 124. In FIG. 6, user logic bus 146 is connected to printer bus 126 for communication with printer CPU 121. Bus 146 is coupled to host computer interface 141 which is connected to bi-directional line 106 for carrying out bi-directional such as IEEE-1284 protocol communication. Accordingly, bi-directional communication line 106 is also coupled to printer interface 104 of host processor 23. Host computer interface 141 is connected to bus 146 and to DRAM bus arbiter/controller 144 for controlling RAM 129 which includes print buffer 139 (see FIGS. 4 and 5). Data decompressor 148 is connected between bus 146 and DRAM bus arbiter/controller 144 to decompress print data when processing. Also coupled to bus 146 are line feed motor controller 147 that is connected to line feed motor driver 61a of FIG. 4, image buffer controller 152 which provides serial control signals and head data signals for each of print heads 130a and 130b, and heat pulse generator 154 which provides block control signals and analog heat pulses for each of print heads 130a and 130b. Carriage motor control is performed by CPU 121 through I/O ports unit 127 and carriage motor driver 66a since line feed motor 61 and carriage motor 66 is may operate concurrently.

Control logic 124 operates to receive commands from host processor 23 for use in CPU 121, and to send printer status and other response signals to host processor 23 through host computer interface 141 and bi-directional communication line 106. Print data and print buffer memory addresses for print data received from host processor 23 are sent to print buffer 139 in RAM 129 via DRAM bus arbiter/controller 144, and the addressed print data from print buffer 139 is transferred through controller 144 to print engine 131 for printing by print heads 130a and 130b. In this regard, heat pulse generator 154 generates analog heat pulses required for printing the print data.

Figure 7:
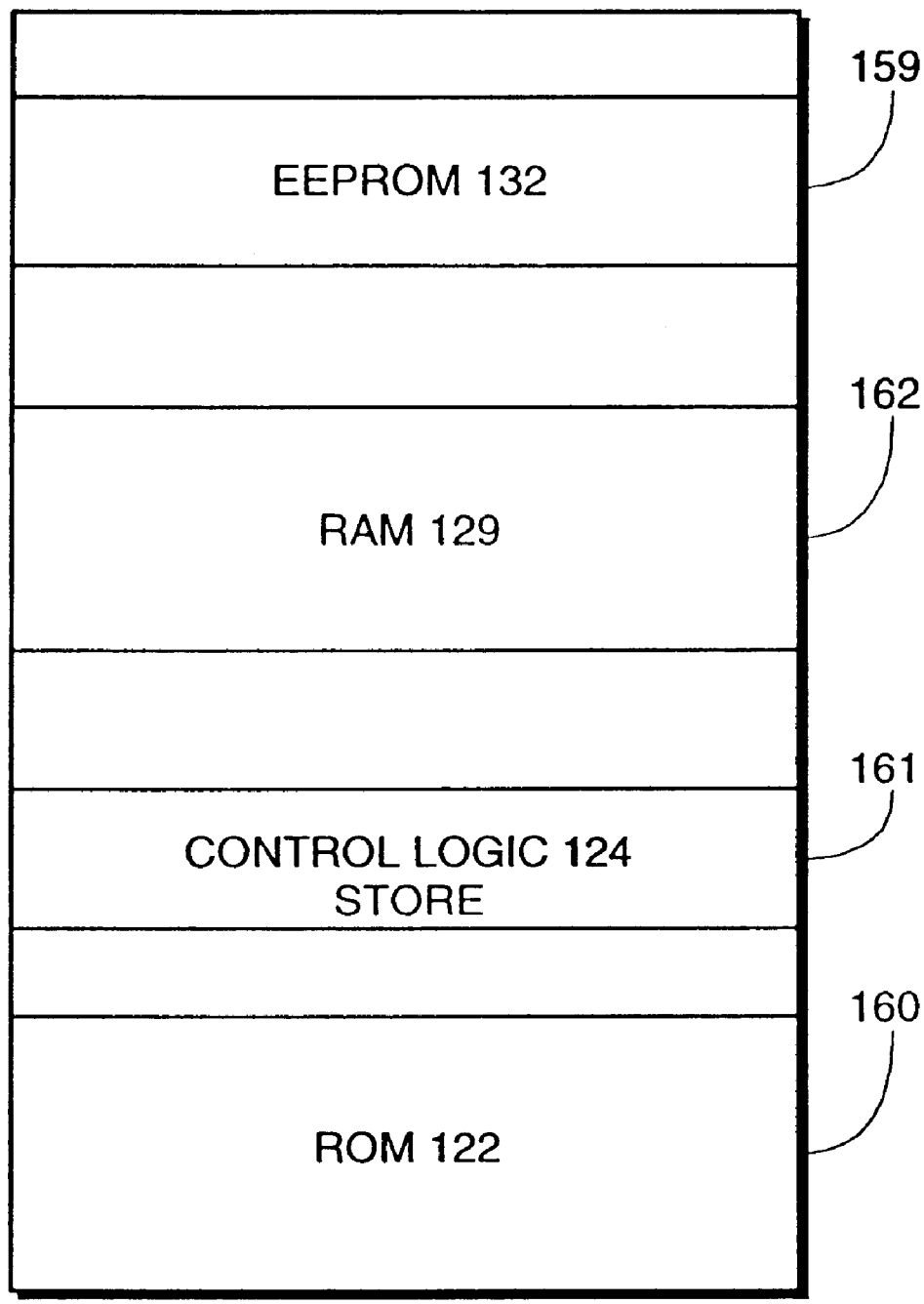
FIG. 7 shows the memory architecture of the printer of the present invention.

FIG. 7 shows the memory architecture for printer 30. As shown in FIG. 7, EEPROM 132, RAM 129, ROM 122 and temporary storage 161 for control logic 124 form a memory structure with a single addressing arrangement. Referring to FIG. 7, EEPROM 132, shown as non-volatile memory section 159, stores a set of parameters that are used by host processor 23 and that identify printer and print heads, print head status, print head alignment, and other print head characteristics. EEPROM 132 also stores another set of parameters, such as clean time, auto-alignment sensor data, etc., which are used by printer 30. ROM 122, shown as memory section 160, stores information for printer operation that is invariant, such as program sequences for printer tasks and print head operation temperature tables that are used to control the generation of nozzle heat pulses, etc. A random access memory section 161 stores temporary operational information for control logic 124, and memory section 162 corresponding to RAM 129 includes storage for variable operational data for printer tasks and print buffer 139.

Figure 8A:
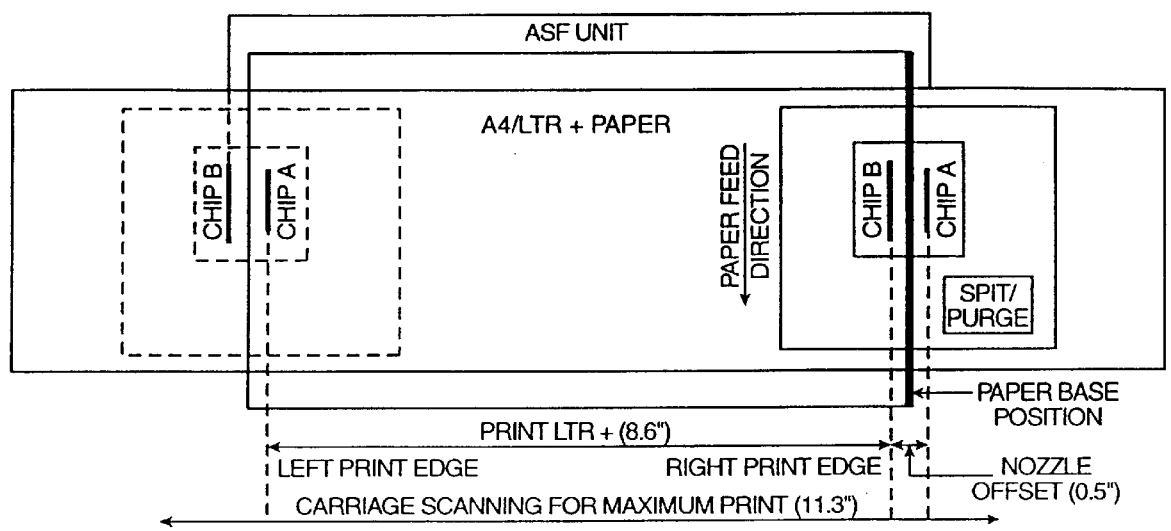
FIGS. 8A, 8B, and 8C depict print head configurations used with the present invention.
Figure 8B:
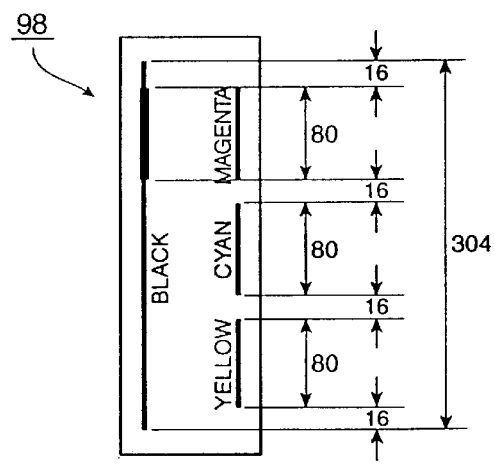
Figure 8C:
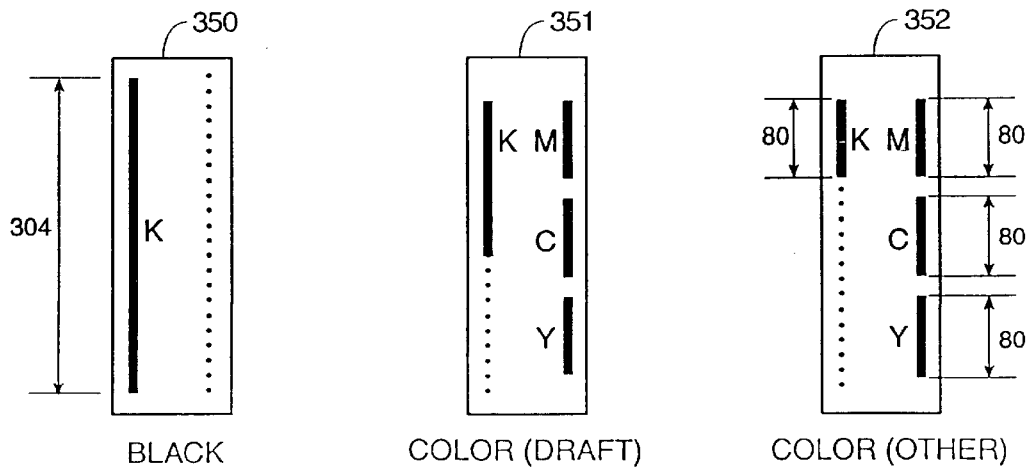

FIGS. 8A through 8C depict a print head configuration according to the invention. FIG. 8A shows a relationship of a print head to a recording medium and the carriage scanning boundaries. FIG. 8B shows a close-up, face-on view of nozzle configurations for a case in which printer 30 includes print head 98, corresponding to either print head 130a or 130b. As seen in FIG. 8B, print head 98 has 304 black nozzles, 80 magenta colored nozzles, 80 cyan colored nozzles, and 80 yellow colored nozzles that are arranged near-vertical, with each nozzle spaced to adjacent nozzles at a 600 dpi vertical pitch. Each color group of nozzles is separated from an adjacent group by a vertical gap corresponding to 16 nozzles. The nozzles are preferably arranged at a slight oblique slant so that as the print head is moved across the recording medium, it is possible to fire the nozzles in rapid succession, rather than all at once, so as to print a vertical line. The power and control requirements for firing nozzles in rapid succession are significantly reduced relative to those for firing all at once. One preferable arrangement of slant angle would correspond to a one pixel horizontal change for every 112 vertical nozzles, at 600 dpi resolution.

Figure 19A:
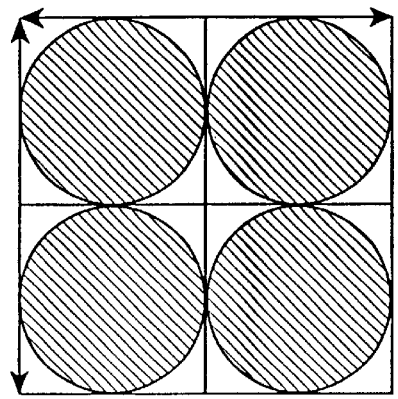
FIG. 19A depicts the process of printing one target pixel with high resolution black ink droplets.

During its operation, printer 30 includes different modes which may be set via commands issued to printer 30 by host processor 23. For example, the printer may print in a normal resolution print mode (300 dpi), or a high resolution print mode (600 dpi). Generally, black ink is printed the same in both a high resolution print mode and a normal resolution print mode by the print head ejecting large ink droplets, such as those seen in FIG. 19A. However, with regard to color ink, i.e. CMY, an image printed in a high resolution print mode generally is printed with more ink droplets per target pixel than a color image printed with a normal print mode. In order to eject the additional ink droplets however, a high resolution print mode generally requires twice as many scans of the print head compared to a normal resolution print mode.

Figure 8D:
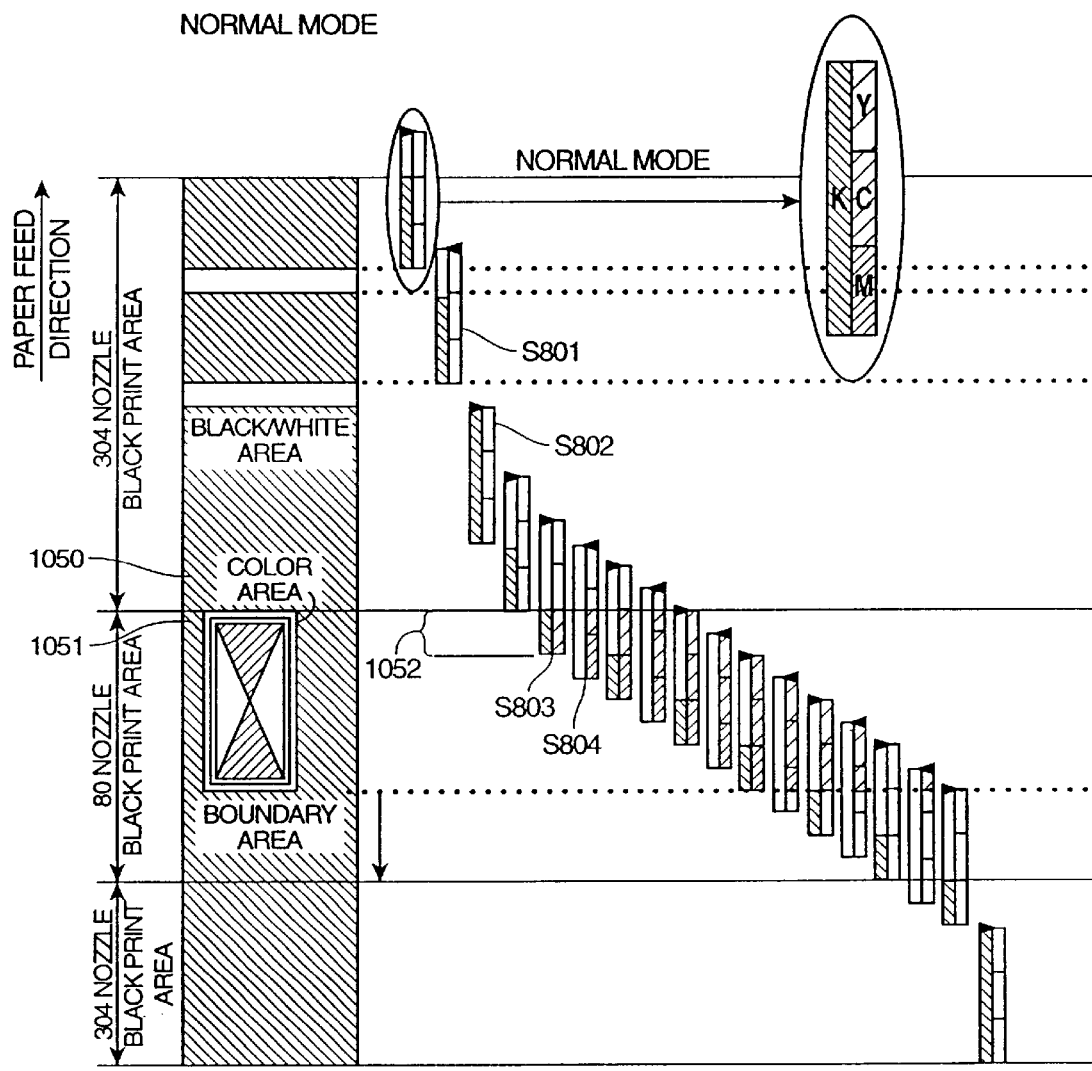
FIGS. 8D and 8E depict examples of print head scans and nozzle firing for a normal and a high resolution print mode, respectively.
Figure 8E:
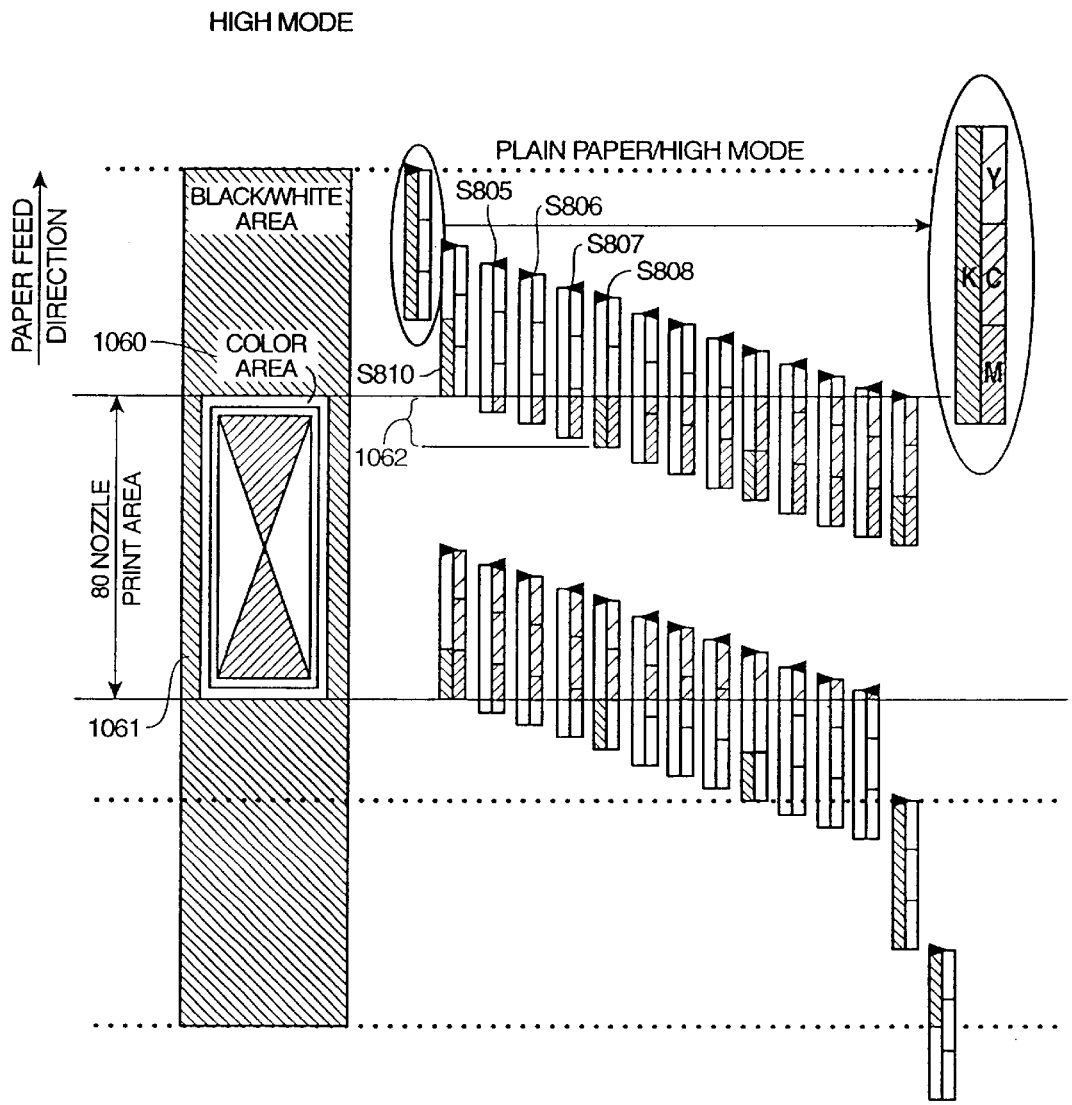

By way of example, FIGS. 8D and 8E show scans of a print head across a recording medium and the print head nozzle firing configuration used to eject ink in each scan for an image that contains both black/white print areas and a color print area. FIG. 8D shows an example of a normal print mode. As shown, for printing in a black/white region, such as region 1050, the print head makes one scan across the recording medium (scan S801) to print black ink. The recording medium is advanced after each scan to perform the next black/white scan without performing a second scan across the data printed in the previous scan.

However, for printing in a color region, the print head makes overlapping scans across the recording medium. For a normal print mode, two scans are generally required, whereas, for a high resolution print mode, four scans are generally required.

For example, as shown in FIG. 8D, to print a 78 nozzle vertical pitch (1052) of a color region (1051), two scans (S803 and S804) are required. In contrast, for a high resolution print mode, as shown in FIG. 8E, to print a 78 nozzle vertical pitch (1062) of a color region (1061), four scans (S805, S806, S807 and S808) are required. As a result, the time required for printing a high resolution color image is generally twice that for printing a normal resolution color image.

Figure 9:
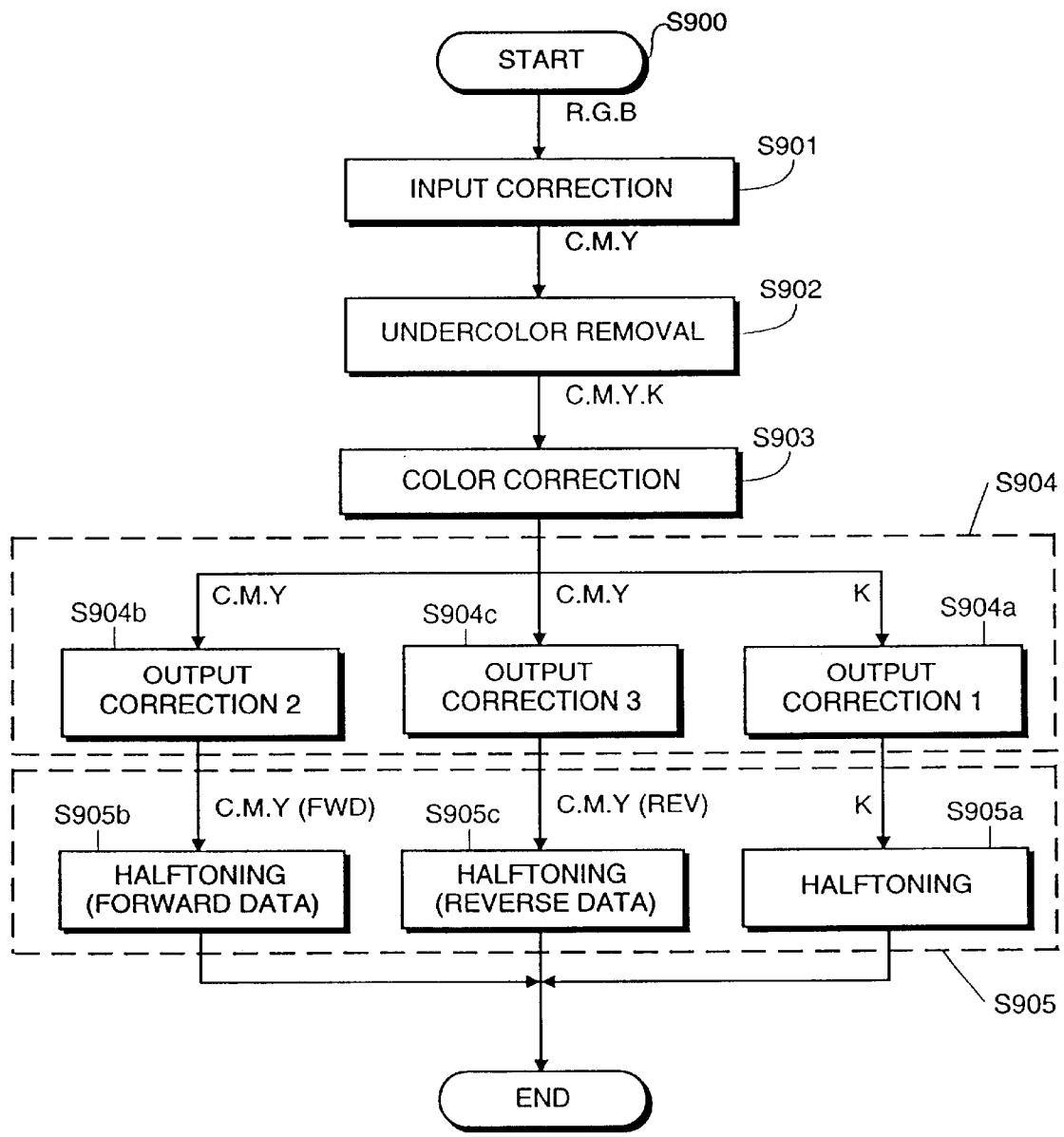
FIG. 9 is a flow diagram depicting a print driver processing RGB print data into binary data to be sent to the printer of the present invention.

FIG. 9 is a flow diagram showing process steps wherein a print driver converts RGB data into binarized print data to be sent to a printer. Generally speaking, the process steps shown in FIG. 9 are a print driver executable in a host computer so as to output binary print data corresponding to a raster image to a printer that has a print head with vertically-oriented print elements and that forms images in a band on a recording medium. Multi-level data for successive pixels of the raster image are accessed, and the multi-level data for each successive pixel is binarized into binary print data corresponding to a print element on the print head.

In the arrangement shown in FIG. 9, the printer is a color printer whose vertically-oriented print elements are arranged into plural groups respectively corresponding to each of plural subtractive color components, such as CMYK color components, and multi-level data is provided for each of plural additive color components, such as RGB color components. Under these circumstances, each successive pixel of multi-level data is binanarized into binary data for each of the plural subtractive color components. The binarized data is then communicated from the host computer over an interface such as bi-directional interface 106 to the printer for printout thereby.

In more detail, in step S900, print driver 114 receives RGB print data for printout by printer 30. The RGB print data is multi-level image data for each of plural R, G and B color planes, and generally is received through graphic device interface commands from a windowing graphical device interface (GDI) environment from operating system 111. In step S901, the multilevel RGB data is converted to multilevel CMYK through any suitable processing, such as matrix multiplication, followed by undercolor removal (step S902), as follows:

$$\begin{bmatrix} C \\ M \\ Y \end{bmatrix} = \begin{bmatrix} \alpha_1 + \alpha_2 & 1 - \alpha_1 & 1 - \alpha_2 \\ 1 - \beta_1 & \beta_1 + \beta_2 & 1 - \beta_2 \\ 1 - \gamma_1 & 1 - \gamma_2 & \gamma_1 + \gamma_2 \end{bmatrix} \begin{bmatrix} R \\ G \\ B \end{bmatrix}$$

and:

K=min (C,M,Y)
C=C−K
M=M−K
Y=Y−K

In step S903, color corrections are applied to the CMYK multilevel data. Color corrections applied in step S903 generally relate to tailoring of the multi-level image data to match color output characteristics of color printer 30. Thus, for example, color correction in step S903 accounts for differences between the color characteristics of the actual dyes used in color printer 30 as opposed to idealized dyes, and further accounts for differences in color perception such as correction in the blue/purple region for the so-called Abney effect.

Step S904 applies output corrections to the CMYK multilevel data. Output corrections account for output characteristics of color printer 30, such as misalignment between respective print heads 31a and 31b, differences in print densities of those print heads, density blending between the overlap area of the print heads, and the like. Misalignments between print heads 31a and 31b are corrected as described in U.S. application Ser. No. 08/901,560, "Printer Driver With An Auto-Alignment Function", the contents of which are incorporated by reference as if set forth in full herein. Generally speaking, to correct for misalignments such as a vertical offset between the printing positions of heads 31a and 31b, an unshown optical sensor in printer 30 senses the actual printed output of predetermined print patterns in the overlap area of the two print heads, so as to drive a numerical value representation of the offset/misalignment between the two print heads. The print position of the CMYK multilevel data is then changed based on the numerical offset value so as to ensure that dots are printed by each head at positions that compensate for the misalignment.

As seen in step S904, output corrections are made for one of three types of data, dependent upon whether the data is color or black and also dependent upon whether the color data is printed in a forward or a reverse scan. In this regard, where the image is to be printed with black ink (K), output correction step S904a is performed. However, where the image is to be printed with color ink (CMY), either output correction step S904b or S904c is performed, depending on whether the print head scan is in the forward or reverse direction. It should be noted that in the present invention, black ink is preferably printed in forward scans of the print head, and not in reverse scans. The output correction processes of steps S904a through S904c are described in more detail below with regard to FIGS. 16A through 17D.

Preferably, steps like S903 and S904, which apply corrections to the CMYK multilevel data in preparation for printout, perform corrections on multilevel data rather than on binary data. This is because of the finer degree of control available over multi-level image data as opposed to binary image data. For example, density corrections and color shift corrections are far easier to apply to multi-level image data than to binary image data.

Step S905 binarizes the corrected CMYK multilevel data (also known as halftoning) and stores the binarized print data in print data store 136.

FIG. 10 is a flow diagram showing process steps of print driver 114 in host computer 20 for sending data to printer 30. Although the invention has been described with respect to printer 30 having a dual print head configuration, the following description will be made for a printer having a single print head for simplicity. As seen in FIG. 10, in step S1001, print driver 114 sends binarized low resolution 300 dpi print data for one scan line of data to the printer. An example of this binarized print data for one scan line is represented by 200 in FIG. 11A.

In step S1002, print driver 114 sends a Select Heat Pulse (SHP) command, including scan frequency information (represented by 201 in FIG. 11A), to printer 30. As will be described below, the scan frequency information is used by the printer to set the scan frequency for the print head, thereby changing the number of ink droplets ejected by the print head in any one scan. It should be noted however, that the scan frequency preferably remains constant for all forward scans of the print head but may be changed for each reverse scan, e.g. 18 Khz changed to 36 Khz.

Figure 11A:
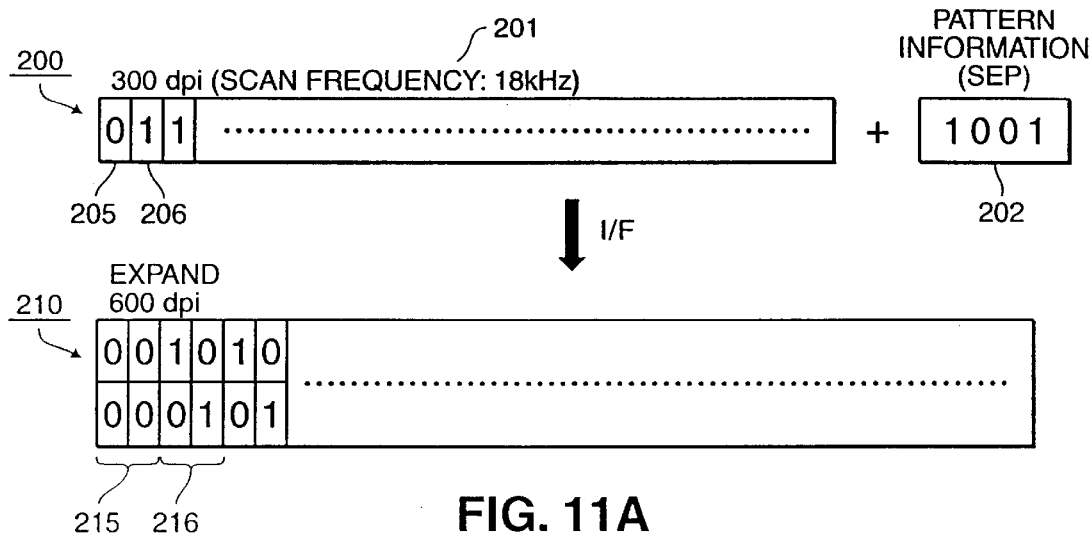
FIGS. 11A, 11B, and 11C depict the data expansion process in the printer according the invention.
Figure 11B:
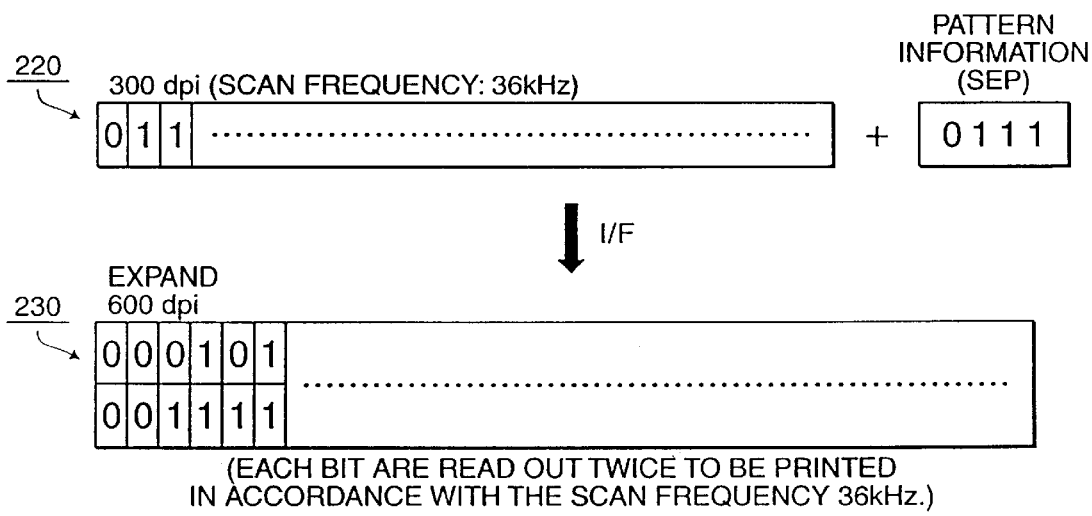

In step S1003, print driver 114 sends a Select Expansion and smoothing Pattern (SEP) command, including a 4-bit pattern information, or a pattern key (represented by 202 in FIG. 11A), to printer 30. As will be described in more detail below with regard to FIG. 11C, printer 30 uses the 4-bit pattern key for expansion of the low resolution 300 dpi data sent from host computer 20 into high resolution 600 dpi data. For example, as seen in FIG. 11A, printer 30 uses pattern key 202 to expand low resolution 300 dpi scan data 200 into high resolution 600 dpi scan data 210.

In step S1004, print driver 114 sends a Direction (DIR) command to printer 30. Printer 30 uses the DIR command information to determine whether the present scan line is to be printed in a forward scan or a reverse scan of the print head.

Next, in step S1005, print driver 114 sends a Print (PRT) command to printer 30. Printer 30 then processes the scan data along with the SEP, SHP and DIR commands as will be discussed below with regard to FIG. 12.

Following the PRT command, print driver 114 determines whether any print data remains in print data store 136 to be sent to printer 30 (step S1006). If print data store 136 is empty, indicating that the printed image has been completed, then print driver 114 ends operation (step S1007). However, if print driver 114 determines that data remains in print data store 136, then flow returns to step S1001 to send data for the next scan line to printer 30. The flow continues in this manner until all print data stored in print data store 136 has been sent to printer 30 for printout.

Figure 12:
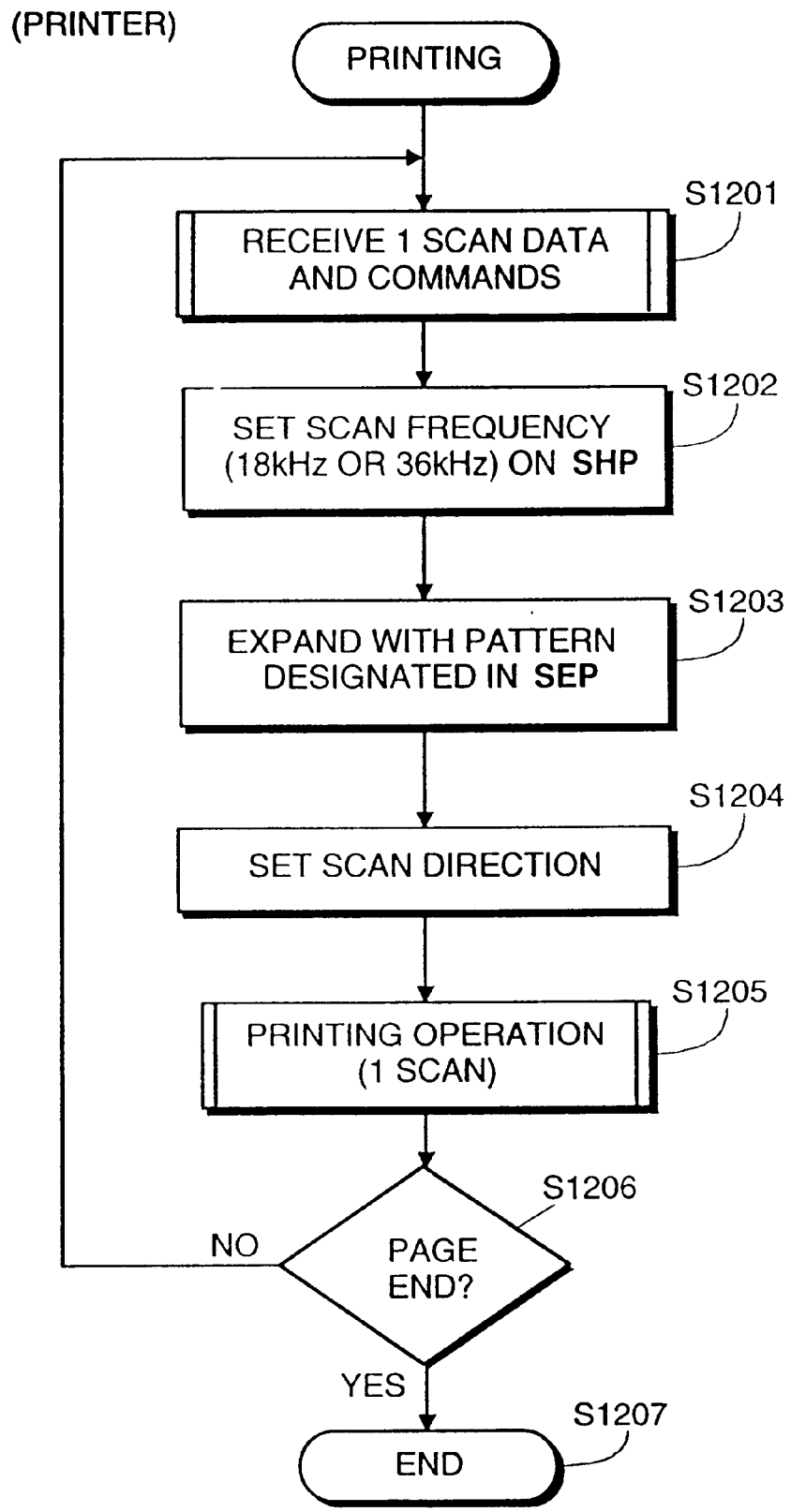
FIG. 12 is a flow diagram depicting the printer processing data and commands received from the print driver of the host processor.

As seen in FIG. 12, in step S1201, printer 30 receives scan data for one scan line, such as low resolution scan data 200, as well as the SHP, SEP, DIR and PRT commands sent by print driver 114 in host computer 20. Upon receiving the data and commands, the received data is stored in print buffer store 139 in printer 30.

In step S1202, upon receiving the SHP command, which preferably includes a scan frequency of either 18 or 36 Khz, the printer sets the scan frequency for the print head. As previously mentioned, the frequency of all forward scans preferably remains constant and therefore are set to the same frequency, i.e. 18 Khz. However, regarding the scan frequency for reverse scans, the frequency can be changed from 18 to 36 Khz. The effect of the scan frequency on the printed output is to have the print head eject additional ink droplets per target pixel as will be described in more detail below with regard to FIGS. 13A and 13B.

In step S1203, printer 30 then expands the low resolution 300 dpi scan data into high resolution 600 dpi scan data using the pattern key received with the SEP command. The expansion process is preferably performed by control logic 124 in printer 30. The expansion process will now be described in more detail with regard to FIG. 11C.

Figure 11C:
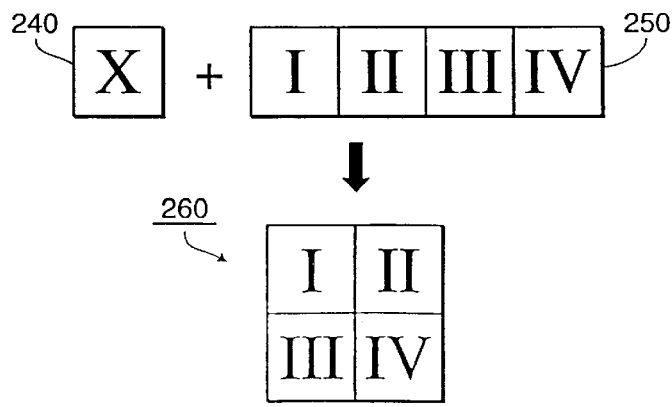

As seen in FIG. 11C, each 1-bit of binary low resolution scan data 240, (generally represented by "X" where "X" is binary data, either a "0" or a "1"), where 240 generally represents each bit of scan data in scan line 200 shown in FIG. 11A, is expanded into high resolution scan data 260 using pattern key 250. Each of the 1-bit binary data bytes (generally represented as I, II, III, IV) in pattern key 250 corresponds to one of four quadrants in the expanded data 260. For instance, the first data bit I in pattern key 250 represents data in quadrant I of expanded data 260, the second data bit II of pattern key 250 represents data in quadrant II of expanded data 260, etc.

Figure 1A:
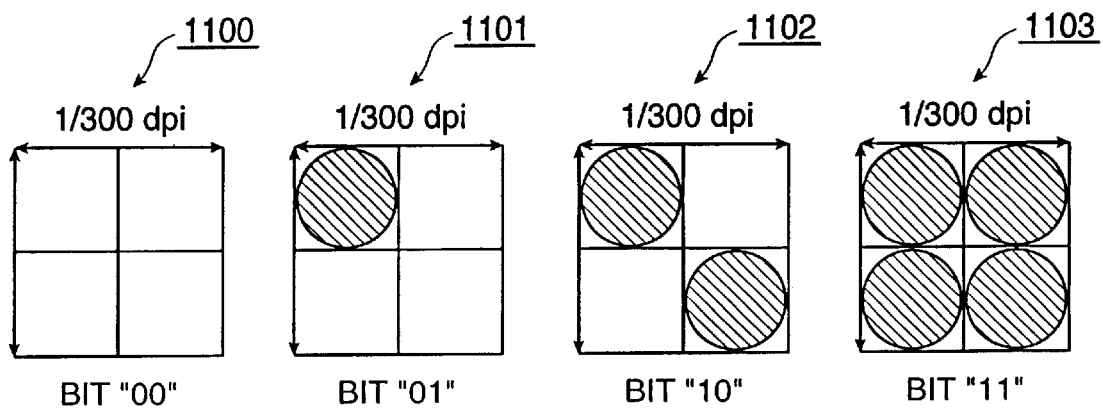
FIGS. 1A, 1B and 1C depict an example of a known expansion process wherein a printer expands 300 dpi data into 600 dpi data.
Figure 1B:
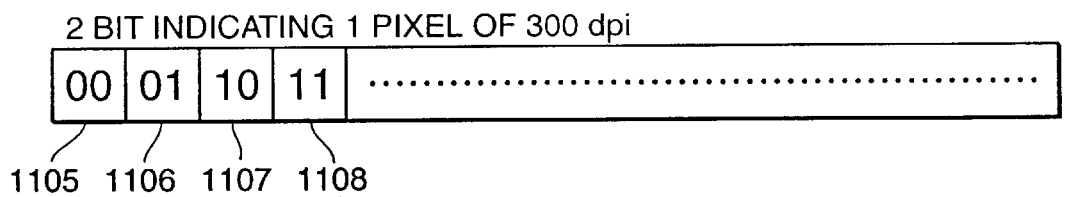
Figure 1C:
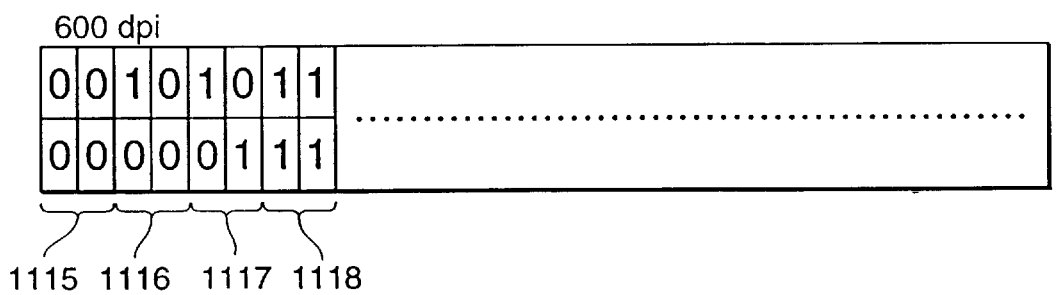

By way of example, referring to FIG. 11A, 1-bit data 205 is expanded into 4-bit data 215 using pattern key 202. As seen in FIG. 11A, 1-bit data 205 is "0". In any case where the 1-bit data in a scan line is a "0", all data bytes in each of the quadrants of the expanded data are also "0", regardless of the pattern key pattern. Therefore, all quadrants of the expanded data 215 are "0", corresponding to the "0" 1-bit data 205.

The next data bit in scan line 200 is 1-bit data 206, which for the present example is a "1". Printer 30 uses pattern key 202 to expand 1-bit data 206 into 4-bit data 216. Recalling the aforementioned expansion technique of FIG. 11C, expanded 4-bit data 216 results from the expansion process. As shown, the first byte of pattern key 202 is a "1", which is placed in quadrant I of expanded data bit 216; the second byte of pattern key 202 is a "0", which is placed in quadrant II of expanded data bit 216; the third byte of pattern key 202 is a "0", which is placed in quadrant III of expanded data bit 216; and the fourth byte of pattern key 202 is a "1", which is placed in quadrant IV of expanded data bit 216. This process is repeated for all of the 1-bit data bytes in scan line 200 to form the resulting expanded 600 dpi scan data 210, thus completing step S1203 for the current scan line.

Flow then moves to steps S1204, wherein control logic 124 in printer 30 sets the scan direction based on the DIR command received from print driver 114. Once the data expansion is completed and the scanning frequency and direction have been set, printer 30 then prints out an image based on the expanded 600 dpi data for the one scan line processed by the printer.

After printing the first scan line according to the foregoing, the printer then determines whether any additional print data is present in print buffer store 139 for printing subsequent scan lines. If so, flow returns to step S1201 for the printer to process the data for the next scan line. If all print data in print buffer store 139 has been processed, then printer 30 ends the print processing and ejects the recording medium from the printer.

As previously stated, printer 30 sets the scan frequency in step S1202. According to the invention, the effect on the frequency change is to have the print head eject additional ink droplets per target pixel. This process will now be described in more detail with regard to FIGS. 13A and 13B. Recall, however, that the changed frequency generally only applies to reverse scans and not forward scans of the print head. Therefore, the following discussion would only apply to a reverse scan.

Shown in FIGS. 13A and 13B are quadrants 300 and 310, respectively, each representing one of the four quadrants of the expanded data, i.e. quadrant I, II, III, or IV of FIG. 11C. In a case where an ink droplet is to be ejected by the print head into one of these quadrants, i.e. data in the quadrant is a "1" and not a "0", the number of ink droplets ejected depends on the scan frequency. As seen in FIG. 13A, where the scan frequency is set to 18 Khz, one ink droplet 301 is ejected into quadrant 300. However, as seen in FIG. 13B, where the scan frequency is set to 36 Khz, two ink droplets 311 and 312 are ejected into quadrant 310. Therefore, increasing the scan frequency enhances the image resolution by ejecting more ink droplets per pixel.

FIGS. 14A through 14C depict an example of a printer receiving one bit of low resolution scan data as well as SEP, SHP, and DIR commands for four scan lines, and the printer expanding the data and printing one target pixel. In this example, the selected print mode is a color, high resolution print mode with bi-directional printing. However, the invention can also be performed by a uni-directional print mode, i.e. only printing in a forward scan. Also, for the present example, the scan frequency of the print head remains constant for all forward and reverse scans. Further, the target pixel for this example is a 300 dpi×300 dpi pixel, shown as target pixel 410 in FIG. 14C.

As shown in FIG. 14A, 300 dpi scan data for a first scan (scan 1), a second scan (scan 2), a third scan (scan 3) and a fourth scan (scan 4) for one target pixel 410, as well as SEP, SHP and DIR commands for each scan line are received by the printer. Upon receiving the data and commands, the printer stores them in print buffer store 139. The printer then processes each scan line. Using the expansion process described with regard to FIG. 11C, the printer expands the 300 dpi data for the first scan (scan 1 of FIG. 14A) into 600 dpi data, with the resulting expanded 600 dpi data shown in FIG. 14B (scan 1). The printer then sets the SHP and DIR commands for the first scan (18 Khz and Forward respectively as shown in FIG. 14A) and performs the first scan, whereby ink droplet 400 (shown in FIG. 14C) is printed in a forward scan. The first scan (scan 1) is now complete.

Printer 30 then processes the 300 dpi data for the second scan (scan 2 of FIG. 14A) and expands it into 600 dpi data (scan 2 shown in FIG. 14B). The printer then sets the SHP and DIR commands (18 Khz and Reverse respectively as shown in FIG. 14A) for the second scan and performs the second scan, whereby the printer ejects ink droplets 401 in a reverse scan. The second scan is now complete, at which time the printer advances the recording medium ¼ of a 300 dpi pixel, or about a 1200 dpi pitch advancement.

Printer 30 then processes the 300 dpi data for the third scan (scan 3 of FIG. 14A) and expands it into 600 dpi data (scan 3 shown in FIG. 14B). The printer then sets the SHP and DIR commands (18 Khz and Forward respectively) for the third scan and performs the third scan, whereby the printer ejects ink droplets 402 in a forward scan. The third scan is now complete.

Printer 30 then processes the 300 dpi data for the fourth scan (scan 4 of FIG. 14A) and expands it into 600 dpi data (scan 4 shown in FIG. 14B). The printer then sets the SHP and DIR commands (18 Khz and Reverse respectively) for the fourth scan and performs the fourth scan, whereby the printer ejects ink droplets 403 in a reverse scan. The fourth scan is now complete and target pixel 410 has been printed.

As a result of the foregoing, the printed pattern of ink droplets within the target pixel is changed in each scan according the pattern key. Accordingly, a high resolution image is printed but the data transmittal is faster than conventional printers due to the expansion process.

Although the previous example was described with regard to a bi-directional print mode, the invention could also have been performed in a uni-directional print mode. In such a case, the R direction commands in FIG. 14A would be an F to indicate a forward scan. Accordingly, after the first scan prints ink droplet 400, the print head would return to begin a second successive forward scan. As a result, ink droplets 401 are printed in a second forward scan rather than a reverse scan. The process would continue by advancing the recording medium and printing ink droplets 402 and 403 respectively in successive third and fourth forward scans.

Another example will now be discussed with regard to FIGS. 15A through 15C. In this example, the selected print mode is a color, normal resolution print mode. Also in this example, the scanning frequency is changed from 18 Khz to 36 Khz between a first (forward) scan and a second (reverse) scan. The target pixel is again a 300 dpi×300 dpi pixel shown as target pixel 510 in FIG. 15C.

Figures 15A, 15B, 15C:
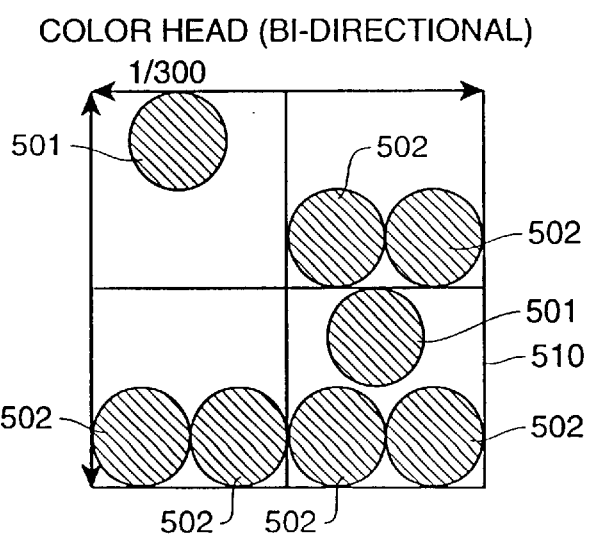
FIGS. 15A, 15B and 15C show an example of printout within one target pixel according to the invention for a normal resolution print mode.

As shown in FIG. 15A, 300 dpi scan data for a first scan (scan 1) and a second scan (scan 2) for one target pixel (510), as well as SEP, SHP and DIR commands for each scan line are received by the printer. Upon receiving the data and commands, the printer stores them in print buffer store 139. The printer then processes each scan line. Using the expansion process described with regard to FIG. 11C, the printer expands the 300 dpi data for the first scan (scan 1 in FIG. 15A) into 600 dpi data, with the resulting expanded 600 dpi data shown in FIG. 15B (scan 1). The printer then sets the SHP and DIR commands (18 Khz and Forward respectively) for the first scan and performs the first scan, whereby ink droplets 501 (shown in FIG. 15C) are printed in a forward scan. The first scan (scan 1) is now complete and the printer advances the recording medium ¼ of a 300 dpi pixel, or about a 1200 dpi pitch advancement.

Printer 30 then processes the 300 dpi data for the second scan (scan 2 of FIG. 15A) and expands it into 600 dpi data (scan 2 shown in FIG. 15B). The printer then sets the SHP and DIR commands (36 Khz and Reverse respectively) for the second scan and performs the second scan, whereby the printer ejects ink droplets 502 in a reverse scan. Because the scanning frequency (SHP) for the second scan was changed from 18 Khz to 36 Khz, two ink droplets were ejected into quadrants II, III and IV rather than one. As a result, although the selected print mode was a normal print mode, the image quality is enhanced by the additional ink droplets ejected in each quadrant.

FIGS. 16A through 18C depict an example of a print driver processing RGB data, sending print data and commands to a printer, and the printer printing an image according to the present invention.

Shown in FIG. 16A is four scan lines of color, i.e. C, M, or Y, input density data for an image after input correction, undercolor removal and color correction operations have been applied, such as steps S900 through S903 discussed with regard to FIG. 9. That is, FIG. 16A depicts four lines of input density scan data before the output correction processes of step S904. FIG. 16B depicts the same four lines of scan data after the output correction processes of step S904. For a better understanding as to how the data depicted in FIG. 16B is derived, the output correction processes of the present invention will now be described in more detail. Two embodiments of the output correction process will be described.

In the first embodiment of the output correction process, a given input density value is used to determined a corrected output density value. Determination of the corrected output density value is dependent on whether the data is for a color or a black image, and whether the color data is for a forward or a reverse scan. In this regard, step S904 depicts three possible output correction processes, S904a (for black data), S904b (for color data/forward scan), and S904c (for color data/reverse scan). For the present example, the data is color, i.e. C, M, or Y data and therefore, output correction processes S904b and S904c are applied.

Figure 17A:
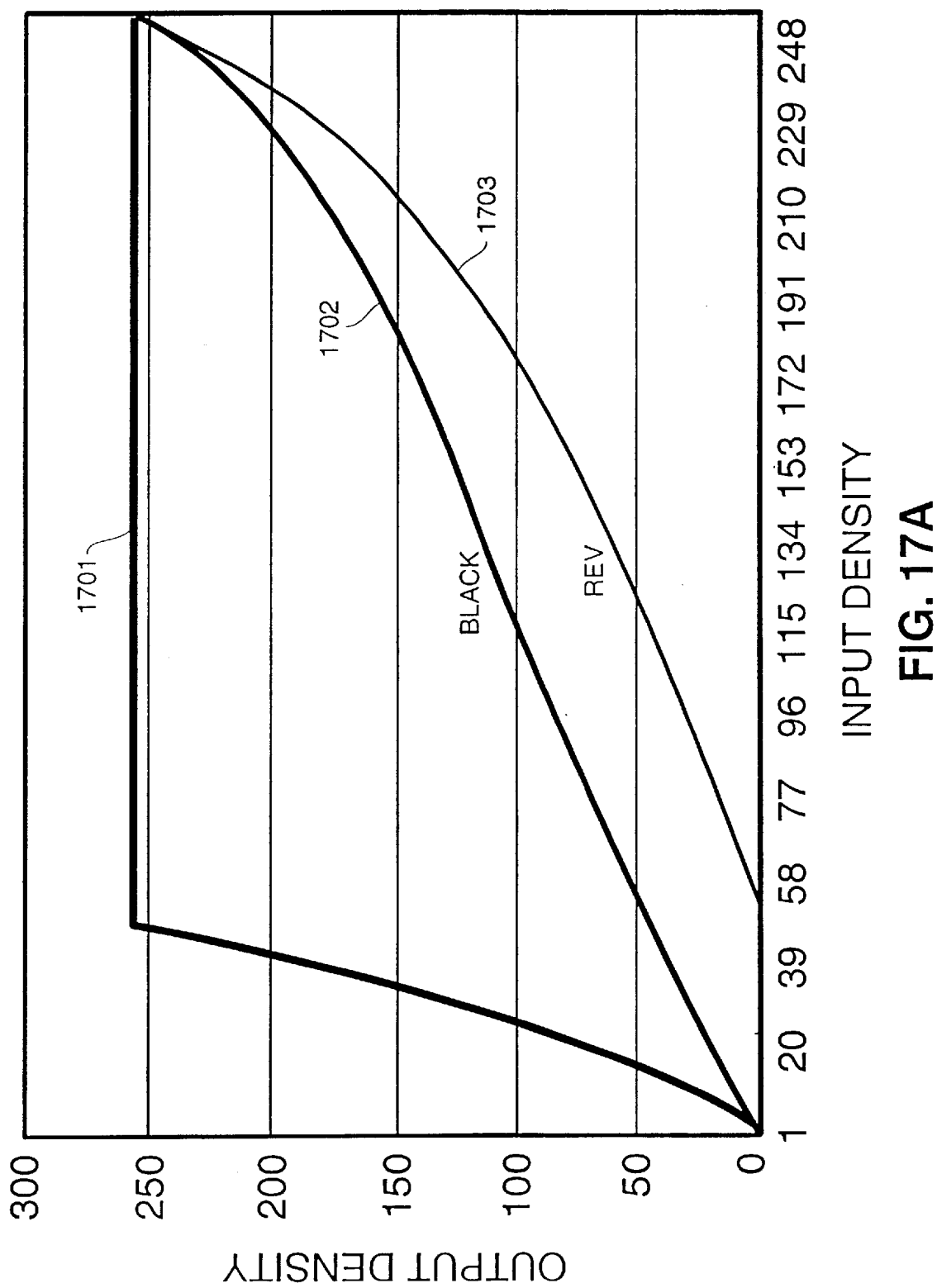
FIGS. 17A, 17B, 17C and 17D are output correction graphs utilized in the output correction processes of FIG. 9.

Regarding the output correction processes of steps S904b and S904c, FIG. 17A is a graph utilized in the correction processes to obtain the output density values from the input density values. In FIG. 17A, the horizontal axis represents input CMYK density values, such as the input density values shown in FIG. 16A. The vertical axis represents corrected output CMYK density values. As shown in FIG. 17A, lines 1701, 1702, and 1703 are used for obtaining the output density values. In this regard, line 1701 is used to obtain output density values for a forward scan of color data, line 1702 is used to obtain output density values for black data, and line 1703 is used to obtain output density values for a reverse scan of color data.

For the present example, to obtain the corrected output CMY data values, the input density data values of FIG. 16A are located along the input density (horizontal) axis. Translating vertically, an imaginary vertical line is drawn to intersect one of the aforementioned lines (1701, 1702 or 1703). From the intersecting location, an imaginary horizontal line is drawn to intersect the output density (vertical) axis, at which point the corrected output density value is obtained.

By way of example, the first data value for the first scan line, a forward scan, of FIG. 16A is 25. Locating 25 along the input density axis, then translating vertically to intersect line 1701 (the forward scan color correction line), and then translating horizontally to intersect the output density axis, results in a corrected output density value of 100. As seen in FIG. 16B, this corrected output density value is shown as the first data value for the first scan line, a forward scan. The process continues to perform output density correction for all of the data values for each scan line. The resulting output correction density values for the present example using the first output correction process embodiment are shown in FIG. 16B.

Figure 17B:
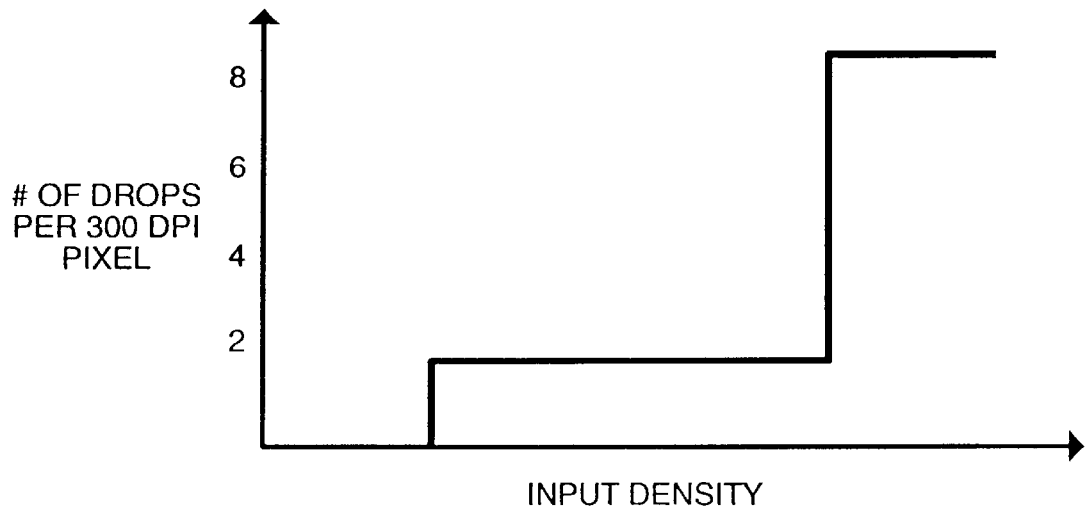
Figure 17D:
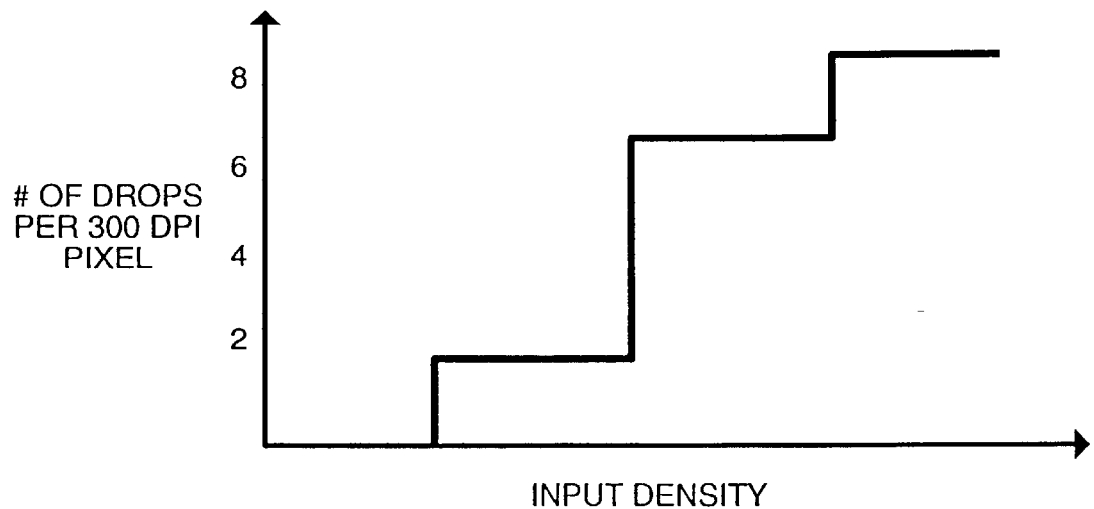
Figure 17C:
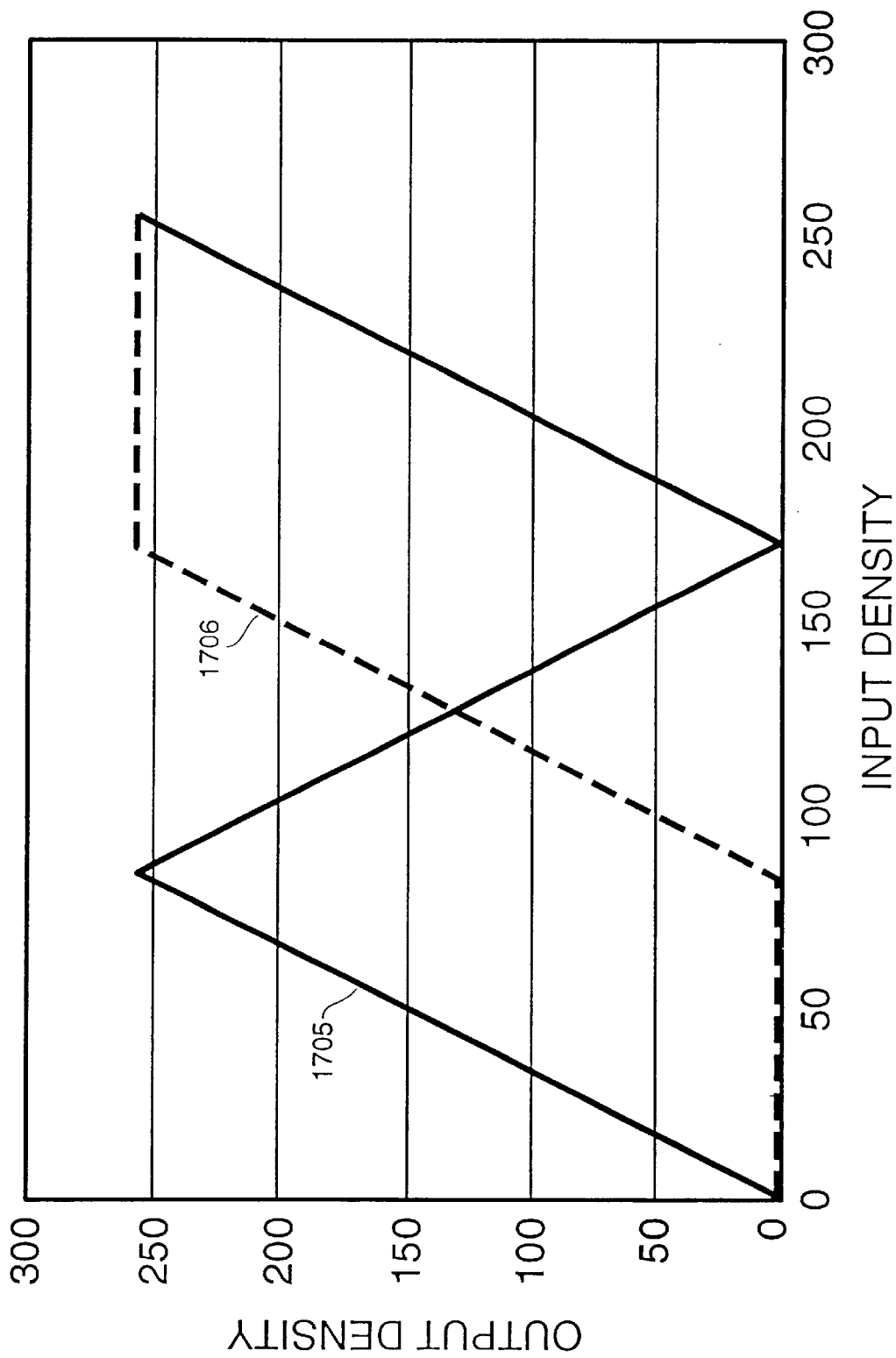

Generally, the graph shown in FIG. 17A, as well as the graphs shown in FIGS. 17B, 17C and 17D, are used by print driver 114 to perform the correction processes. These tables may be incorporated into print driver 114 or be stored elsewhere in fixed disk 25 so that print driver 114 can access the information required to perform the output correction process.

After the output correction values have been obtained, the print driver also determines the number of ink droplets per 300 dpi pixel required to obtain the density value. In this regard, FIG. 17B is a graph for determining the number of ink droplets required per pixel in order to achieve the output density. As shown, the number of ink droplets required for each 300 dpi pixel varies depending on the input density. In FIG. 17B, the number of ink droplets varies from zero for low input density values, such as input density values ranging from 0 to 40, two ink droplets for mid-range density values, such as input density values ranging from 40 to 255, and 8 ink droplets for input density values above 255. The resultant number of ink droplets per pixel is then used by the print driver in the halftoning process of step S905 to generate the binary scan data and the pattern key information for each scan line.

FIGS. 17C and 17D are graphs used for a second embodiment of the output density correction process of the present invention. As previously stated, the output correction process corrects input density values to obtain output density values. FIG. 17C is a graph for obtaining corrected output density values for color ink only, not black. As shown, solid line 1705 is used for obtaining corrected output density values for a forward scan and dashed line 1706 is used for obtaining corrected output density values for a reverse scan.

In the second embodiment, input density values, such as those shown in FIG. 16A, are located along the input density axis of FIG. 17D. Depending on whether the output correction is for a forward scan or a reverse scan, an imaginary vertical line is drawn to intersect the appropriate line, either line 1705 or line 1706. From the intersecting location, an imaginary horizontal translation is then made to intersect the output density axis, thereby obtaining the corrected output density value. For example, an input density value of 100 for a forward scan would result in a corrected output density value of about 200.

As previously stated, the print driver also determines the number of ink droplets per 300 dpi pixel required to obtain the corrected output density. In the second embodiment, FIG. 17D is a graph used for determining the number of required ink droplets. As shown, the number of ink droplets varies from zero for low input density values, such as input density values ranging from 0 to 80, two ink droplets for low-mid-range density values, such as input density values ranging from 80 to 125, six ink droplets for input density values ranging from 126 to 255, and eight ink droplets for input density values above 255.

As can be seen in FIG. 17C, printing six ink droplets can only occur in a reverse scan. That is, for input density values ranging from 151 to 180, a high output density value requiring six ink droplets to be printed, can only be performed in a reverse scan.

In more detail, in FIG. 17C, locating this input density range (151 to 180) and translating vertically until intersecting line 1705, the forward scan line, would result in an output density of less than 50. Utilizing FIG. 17D, an output density value of 50 would require zero, or at best, two ink droplets per pixel. However, locating this input density range (151 to 180) and translating vertically until intersecting line 1706, the reverse scan line, would result in an output density value above 200. Again, using FIG. 17D, an output density value of 200 would require six or eight ink droplets per pixel. Therefore, six ink droplets can only be printed in a reverse scan. Accordingly, using this second embodiment, described with regard to FIGS. 17C and 17D, the image resolution can be increased by printing six ink droplets in a reverse scan.

Returning to the present example of FIG. 16B, after the output density.correction processes are completed, the CMY data is binarized (also known as halftoning), as described with regard to step S905. The resulting binarized data for each scan line of the present example is shown in FIG. 16C. This binary data is then stored in print data store 136 until print driver 114 is ready to send it to the printer.

Figures 18A, 18B, 18C:
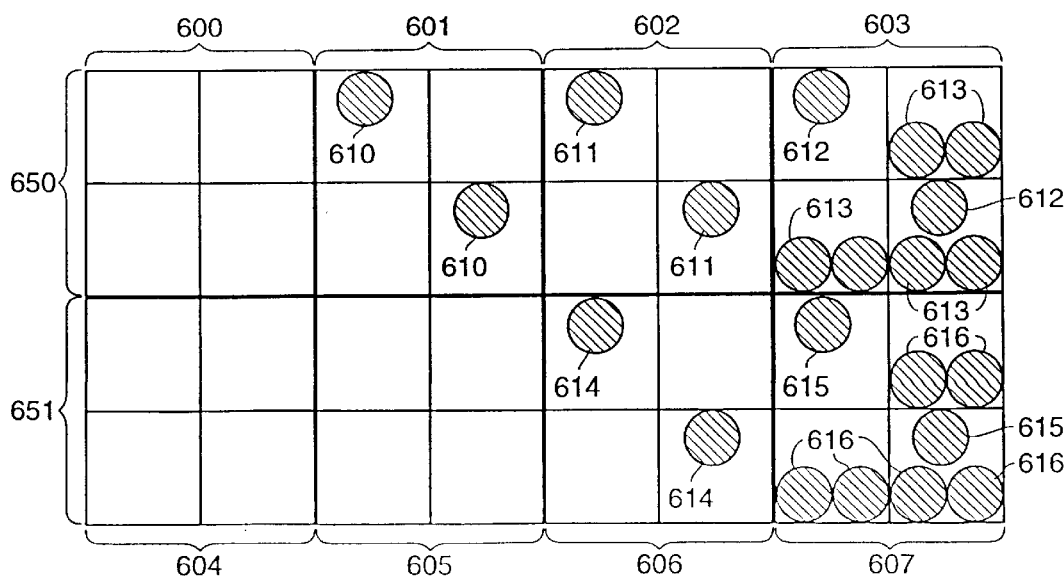
FIGS. 18A, 18B and 18C depict an example of printout for the data shown in FIGS. 16A through 16C.

After the binarization process, the print driver sends the binary data for each scan line stored in print data store 136, along with SEP, SHP, and DIR commands and information from the host computer to the printer. FIG. 18A shows the scan data and corresponding SEP, SHP, and DIR information for each of the four scan lines for the present example.

After the data is sent from the host computer to the printer by the print driver, the printer then expands the 1-bit 300 dpi scan data into 4-bit 600 dpi scan data by utilizing the SEP information as described above with regard to FIG. 11C. For the present example, the expanded 4-bit scan data is shown in FIG. 18B. The printer then uses the DIR and SHP commands and information to set the scanning direction and scanning frequency and prints out each scan line of data.

As shown in FIG. 18B, the 600 dpi scan data for scan line 1 corresponds to a first scan across a series of target pixels 650, wherein series 650 contains 300 dpi×300 dpi target pixels 600, 601, 602, and 603. As can be seen, each "1" contained within the 600 dpi scan data for scan 1 of FIG. 18B designates an ink droplet(s) to be printed in a corresponding quadrant of each of target pixels 600, 601, 602, and 603. In more detail, each "1" in the 600 dpi scan data for scan 1 represents ink droplets 610, 611 and 612, respectively. Accordingly, in a first scan of a print head, ink droplets 610, 611 and 612 are printed.

Prior to the second scan, a reverse scan across the same horizontal series of target pixels 650, the printer advances the recording medium ¼ of a 300 dpi pixel, or about a 1200 dpi pitch advancement. The second scan is then performed across target pixels 600, 601, 602, and 603 to print ink droplets 613. Again, each "1" contained in the 600 dpi data for scan 2 of FIG. 18B corresponds to a quadrant of a target pixel in which an ink droplet is to be printed. Accordingly, ink droplets 613 are printed in target pixel 603.

However, in the present example, the scan frequency for scan 2 has been changed to 36 Khz, and as previously discussed with regard to FIG. 13B, in accordance with the 36 Khz scan frequency, two ink droplets are printed in each quadrant rather than one. Therefore, as shown in FIG. 18C, two ink droplets 613 are printed in each quadrant. As a result, although the print mode is a normal print mode, the image resolution is enhanced by changing the scanning frequency in order to print additional ink droplets.

Prior to the third scan, the recording medium is advanced to the second series of target pixels 651 and the aforementioned process of printing ink droplets continues in the same manner for printing of scan lines 3 and 4 of FIG. 18B.

Figure 19B:
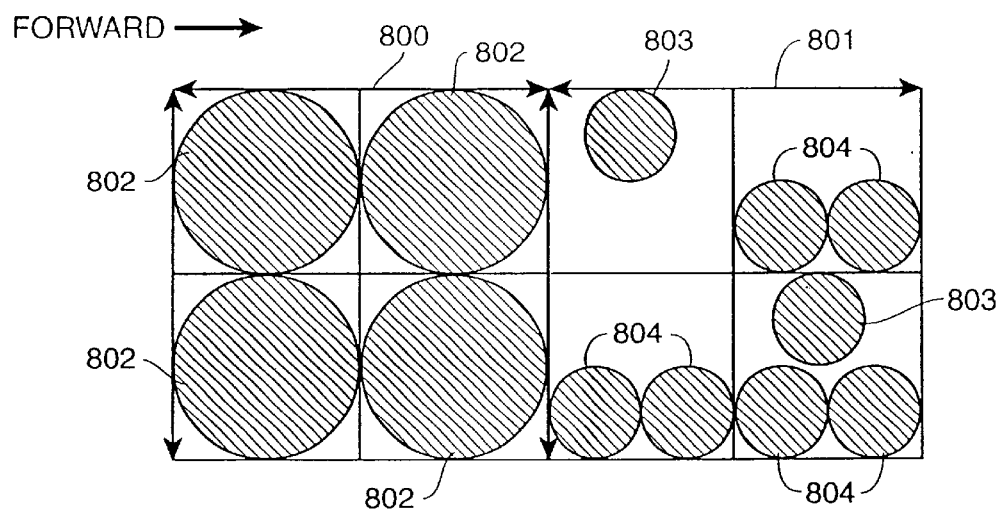
FIGS. 19B and 19C depict the process of printing black and color ink in high resolution on the same scan line.

High resolution printing according to the invention may also be performed by a print head simultaneously printing black ink and color ink in the same scan line. As shown in FIG. 19B, the first target pixel 800 of a scan line is designated for high resolution black ink. As such, large black ink droplets 802 are ejected by the black nozzles of the print head in the first scan, a forward scan. Additionally, for the same first (forward) scan across target pixel 801, color ink droplets 803 are ejected. However, in order to obtain the high resolution image for the color data, a second scan is required to print the high density color ink droplets. As such, in the present example, ink droplets 804 are printed in a reverse scan. As shown, double ink droplets are ejected in each quadrant due to a frequency change from 18 to 36 Khz between the forward and reverse scans.

Figure 19C:
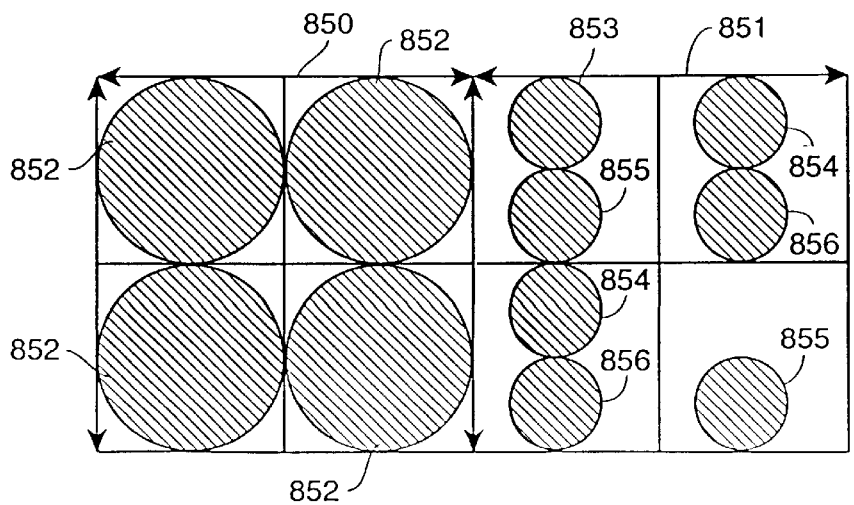

The present example may be changed to a uni-directional print mode, wherein all forward scans are performed rather than a reverse scan. As shown in FIG. 19c, black ink droplets 852 and color ink droplet 853 are ejected in a first forward printing scan. The print head then returns for a second forward printing scan in which color ink droplets 854 are ejected. A third forward scan is performed and ink droplets 855 are ejected. Finally, a fourth forward scan is performed and ink droplets 856 are ejected. In this manner, high resolution printing is achieved similar to that described with regard to FIG. 14C, however, black and color ink are printed in high resolution on the same scan line.

A description will now be made of the power source issues for high resolution printing with reference to FIGS. 20A to 22.

Figure 20A:
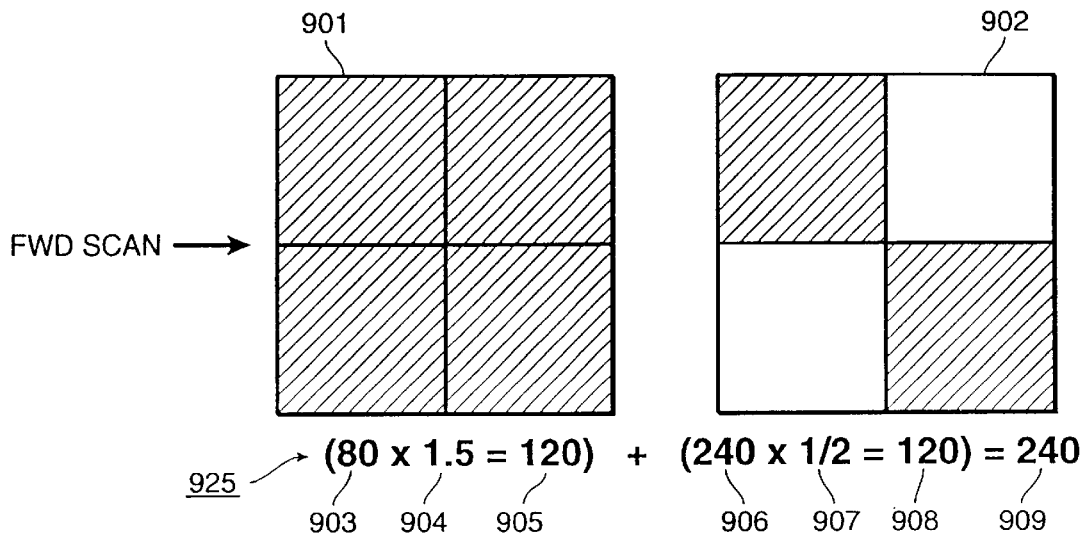
FIGS. 20A and 20B depict the power source requirements for printing two target pixels in one scan line for current ink jet printers.
Figure 20B:
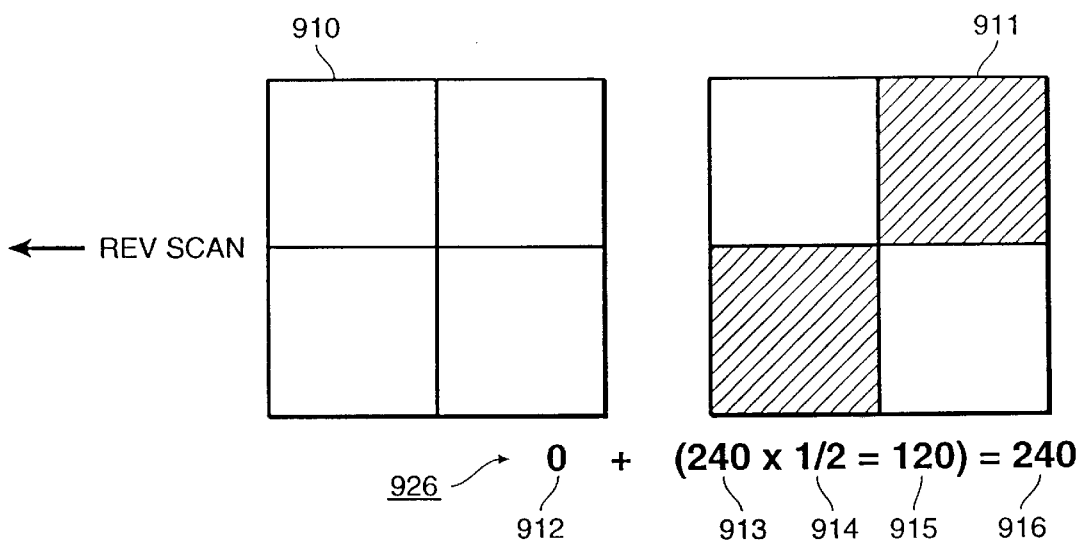

FIGS. 20A and 20B show an example of the power source requirements currently used by ink jet printers for printing a high resolution image. As shown, both black and color ink are printed in the same scan line by a print head having nozzle configurations as shown in FIGS. 8A through 8C. Target pixels 901 and 902 are to be printed along the same scan line, a forward scan, while target pixels 910 and 911, which overlay pixels 901 and 902 respectively, are to be printed in a second scan, a reverse scan. For this example, target pixel 901 is to be printed with black ink, while target pixels 902 and 911 are to be printed with color ink, either C, M or Y. Target pixel 910 receives no ink as indicated by the blank quadrants.

The amount of power required for printing the target pixels is at least a function of the number of nozzles that are to eject ink in any given scan for each respective color of ink, the size of the ink droplets being ejected, the number of passes of the print head across the same scan line, and the pixel pattern that is being printed. In this regard, equations 925 and 926 are used to calculate the power consumption requirements for each scan. As shown, each equation contains values (reference numbers 903, 904, etc.) which, as will be described below, correspond to the aforementioned variables.

The first variable which will be discussed is the number of nozzles. For this example, the print head configuration is print head 352 shown in FIG. 8C. That is, the number of nozzles used for ejecting ink in this example is 80 black (K) nozzles and 240 color (80 C, 80 M, and 80 Y) nozzles. However, as shown in FIG. 22, the number of nozzles for each color of ink can vary and virtually any combination can be used. Accordingly, the power consumption requirements will also vary depending on the nozzle combination used. As shown in FIG. 20A, for calculating the power consumption requirements for the forward scan, variable 903, which has a value of 80, corresponds to the 80 black nozzles being used to print target pixel 901. Variable 906, which has a value of 240, corresponds to the number of color nozzles (C,M,Y) being used to print target pixel 902. For the reverse scan, zero black nozzles are used for target pixel 910 since no ink is printed, and 240 nozzles are again used for printing target pixel 911, as indicated by variable 913.

The next variable is actually a combination of two factors, the ink droplet size and the pixel pattern. Generally, the calculations initially assume that all four quadrants of each target pixel are to receive standard size ink droplets, and as such, each target pixel is initially assigned a value of 1.

However, the initial value is adjusted to account for situations where non-standard size ink droplets are to be ejected or where less than all of the quadrants are designated to receive ink.

Regarding the case where non-standard size ink droplets are used, recall that black ink is printed in high resolution by ejecting large ink droplets. In order to eject large ink droplets, additional power is required to be provided to the nozzles. To account for this additional power, a target pixel that is to receive large ink droplets in all four quadrants is given a value of 1.5. Accordingly, as shown in FIG. 20A, variable 904 has a value of 1.5 indicating that large ink droplets are to be printed in all four quadrants of target pixel 901. It should be noted that large ink droplets are not limited to black ink. For example, color ink, such as yellow may also be printed with large ink droplets since the yellow ink is less visible than the other colors.

Regarding the case where less than all four quadrants of a target pixel are to receive ink droplets in a given scan, less power is required since less ink droplets are being ejected. To account for this fact, the initial value of 1 assigned to each target pixel designated to receive standard size ink droplets in all four quadrants, is reduced by the percentage of quadrants that are not receiving ink.

In the present example, target pixel 902 is to be printed with standard size color ink droplets. However, as shown, only two of the four quadrants are designated to receive ink droplets in the forward scan. Therefore, the initial value is reduced to account for this fact by reducing the initial value by fifty percent. Accordingly, variable 907, which has a value of ½ is used to account for this factor.

Using the equation 925 and the aforementioned variables, it can be seen that 120 units (reference number 905) of power are required to print target pixel 901 and 120 units (reference number 908) are required to print target pixel 902 in the forward scan. As a result, the total power required for printing the forward scan line is 240 units (reference number 909).

Utilizing the same technique and applying the variables to equation 926 results in 120 units (reference number 916) for printing the reverse scan shown in FIG. 20B.

Therefore, in order to print one scan line with two passes as shown in FIGS. 20A and 20B, a print head having the capability of producing 240 units (the highest value required for any one scan) of power is required. As a result, a driving circuit that provides the functionality of operating at 240 units is also required.

The present invention reduces the power requirement by changing the printed pixel pattern. FIGS. 21A and 21B depict the same process described above with regard to FIGS. 20A and 20B, namely, printing black and color ink with print head 352 of FIG. 8C in two target pixels using two passes of the print head. As shown, target pixels 951, 952, 960 and 961 are to be printed. Target pixel 951 is printed with large black ink droplets in the same manner as target pixel 901. Accordingly, the variable values used for calculating the power required for printing pixel 951 is the same as that previously described with regard to pixel 901. Namely, 120 units (reference number 955) are required for printing pixel 951.

However, the process for printing pixels 952 and 961 have been changed by changing the pixel pattern. As described above, variables 957 and 964 are a function of the number of quadrants of the target pixel which are to receive ink in a given scan. As shown in FIG. 21A, pixel 952 is designated to only receive ink in one of the four quadrants in the forward scan. As a result, the power required for printing pixel 952 is 60 units (reference number 958).

Completing the calculations for equation 975 results in 180 units (reference number 959) for printing the forward scan and completing the calculations for equation 976 results in 180 units for printing the reverse scan (reference number 966). Therefore, the maximum number of power units required for printing any one scan line is 180 units. By comparison, the maximum number of units required for printing any one scan line in FIGS. 20A and 20B was 240 units. Therefore, changing the pixel pattern results in a lower power requirement. As a result, the print head and driving circuit capabilities can be reduced.

Although the invention has been described with regard to the printing of black ink in a single pass and color ink in two passes, it should be understood that the invention is not limited to such an embodiment. The invention can be performed with any number of possible combinations of ink colors and passes of the print head. For example, black ink (K) may be ejected in two passes of the print head and color ink (C,Y,M) in four passes; black ink may be ejected in one pass and color ink in three passes; or one of the inks (C,Y,M,K) can be ejected in one pass with the remaining inks being ejected in multiple passes.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A recording system for printing an image on a recording medium by ejecting ink from a print head capable of ejecting at least one color of ink in accordance with image data, comprising:

driving means for driving said print head so that said print head ejects ink onto one pixel area of the recording medium in a plurality of printing scans, including a first printing scan and a second printing scan; and changing means for changing an image resolution printed by said print head for the one pixel area to a first image resolution in the first printing scan and to a second image resolution different from the first image resolution in the second printing scan.

2. A recording system according to claim 1, wherein said print head ejects at least one color of ink onto the one pixel area.

3. A recording system according to claim 2, wherein said print head has at least three groups of nozzles, each group respectively ejecting magenta color ink, yellow color ink, and cyan color ink, and wherein, in a case of said print head printing data using at least one of said three groups of nozzles, said changing means changes the ink amount ejected by said print head in each of the first and second printing scans.

4. A recording system according to claim 1, wherein said changing means changes the image resolution by changing a quantity of ink ejected by said print head in each of the first and second printing scans.

5. A recording system according to claim 4, wherein the first printing scan is a forward printing scan and the second printing scan is a reverse printing scan.

6. A recording system according to claim 4, further comprising an expanding means for expanding input data based on a predetermined pixel pattern, wherein said driving means drives said print head according to the expanded data, and wherein said changing means changes the quantity of ink ejected from said print head by changing the predetermined pixel pattern in each of the first and second printing scans.

7. A recording system according to claim 6, wherein the first printing scan is a forward printing scan and the second printing scan is a reverse printing scan.

8. A recording system according to claim 4, wherein said changing means changes the image resolution by changing a number of ink droplets ejected by said print head onto each pixel area to be printed by said print head, wherein said changing means changes the number of ink droplets by changing a frequency for driving said print head by said driving means in each of the first and second printing scans.

9. A recording system according to claim 1, wherein said changing means changes the image resolution by changing a quantity of ink ejected by said print head onto each of a plurality of pixel areas to be printed in each of the first and second printing scans.

10. A recording system according to claim 9, wherein said changing means changes the quantity of ink ejected by said print head by changing a number of ink droplets ejected by said print head onto each pixel area in each of the first and second printing scans.

11. A recording system according to claim 1, wherein said changing means changes the image resolution by changing a scanning frequency for driving said print head by said driving means in each of the first and second printing scans.

12. A recording method wherein a printer prints an image on a recording medium by performing a plurality of printing scans, including a first printing scan and a second printing scan for one pixel area of the recording medium, comprising the steps of:

transferring low resolution print data from a host computer to the printer;

expanding in the printer the low resolution print data to high resolution print data with pixel patterns, including a first pixel pattern and a second pixel pattern; and changing the pixel pattern for the one pixel area to the first pixel pattern in the first printing scan and to the second pixel pattern in the second printing scan in each of the plurality of printing scans.

13. A recording method according to claim 12 further comprising transferring pattern information indicating the pixel pattern from the host computer to the printer before said expanding step, wherein said pixel pattern is changed in said changing step based on the pattern information.

14. A recording method according to claim 13 further comprising the step of a print head changing an image resolution in each of the first and second printing scans after said step of changing said pixel pattern.

15. A recording method according to claim 12, wherein said second pixel pattern indicates a greater image resolution than the first pixel pattern.

16. A recording method according to claim 15, wherein said transferring step further includes transferring at least first and second scan data for at least one pixel area, said first and second scan data corresponding to each of the first and second pixel patterns, and wherein said printer prints the first scan data with the first pixel pattern and prints the second scan data with the second pixel pattern.

17. A recording method according to claim 16 further comprising the step of said host computer performing an image process of data to be printed so as to generate the first and second scan data, said image processing step being performed prior to said transferring step, wherein said image processing step performs a first image process for the first scan data and a second image process for the second scan data.

18. A recording method according to claim 17, wherein the first and second image processes are an output correction process for generating output density values based on corresponding input density values so as to gain an appropriate image resolution of a printed image in accordance with a characteristic of printing.

19. A recording method according to claim 12, wherein the first printing scan is a forward printing scan and the second printing scan is a reverse printing scan.

20. A recording method for printing data on a recording medium, wherein a host computer transfers data to a printer that prints the data by performing a plurality of printing scans with a print head that prints with at least one color, comprising the steps of:

said host computer generating scan data for each of said plurality of printing scans; and said host computer performing a first image process or a second image process to each of the generated scan data, wherein the scan data processed in one of the first or second image processes is printed in each of the plurality of printing scans of the print head, and the first image process is a process for printing scan data in low resolution by the print head and the second image process is a process for printing scan data in high resolution by the print head.

21. A recording method according to claim 20, wherein the first and second image processes are an output correction process for generating output density values based on corresponding input density values so as to gain an appropriate image resolution of a printed image in accordance with a characteristic of printing.

22. A recording method according to claim 20, further comprising the steps of said host computer transferring low resolution scan data to the printer after said image processing step, and said printer expanding the low resolution scan data to high resolution scan data with a predetermined pixel pattern.

23. A recording method according to claim 20, wherein scan data is printed in a combination of low resolution and high resolution in any one of said plurality of scans by the print head.

24. A recording apparatus for printing an image on a recording medium by ejecting ink from a print head having ink ejection nozzles for ejecting ink of at least a first and a second color, comprising:

driving means for driving the print head so that said print head ejects at least the first color ink or the second color ink onto the recording medium in a plurality of printing scans of the print head, including a first printing scan and a second printing scan; and control means for causing said driving means to eject the first color ink in high resolution and the second color ink in low resolution in the first printing scan by the print head, and causing said driving means to eject the second color ink in high resolution in the second printing scan by the print head.

25. A recording apparatus according to claim 24, wherein said control means causes print data of the second color to be printed in the first printing scan with a first pixel pattern indicating low resolution, and causes print data of the second color to be printed in the second printing scan with a second pixel pattern indicating high resolution.

26. A recording apparatus according to claim 24, wherein said control means changes an operation of said driving means between the first printing scan and the second printing scan so as to change a number of ink droplets printed in a target pixel by the print head.

27. A recording method wherein a printer prints an image on a recording medium by performing a plurality of printing scans, comprising the steps of:

transferring low resolution print data and data expansion pattern information from a host computer to the printer;

expanding in the printer the low resolution print data to high resolution print data using the data expansion pattern information; and printing an image on the recording medium based on the high resolution print data obtained in said expanding step.

28. A recording method according to claim 27, further comprising the step of said printer changing an image resolution in each of said plurality of printing scans.

29. A recording method according to claim 28, wherein said image resolution is changed by said printer changing a number of ink droplets ejected in a target pixel.

30. A recording method according to claim 28, wherein the printer repeatedly performs a forward printing scan and a reverse printing scan by a print head on the recording medium, and wherein said changing step changes the image resolution between a forward printing scan and a reverse printing scan.

31. A recording method according to claim 27, wherein said printer prints at least a first and a second color ink, and wherein said printer performs at least a first scan printing said first color ink in high resolution and said second color ink in low resolution, and performs a second printing scan printing said second color ink in high resolution.

32. A recording method according to claim 27 further comprising the step of said host computer performing an image process of data to be printed so as to generate at least first scan data and second scan data, said image processing step being performed prior to said transferring step, wherein said image processing step performs a first image process for the first scan data and a second image process for the second scan data.

33. A recording method according to claim 32, wherein the first and second image processes are an output correction process for generating output density values based on corresponding input density values so as to gain an appropriate image resolution of a printed image in accordance with a characteristic of printing.

34. A method for processing image data to be printed by a printer that prints an image on a recording medium by performing a plurality of printing scans, comprising the steps of:

generating scan data for printing the image;

organizing the scan data into a first group of scan data comprising data to be printed with black ink, a second group of scan data comprising data to be printed with ink other than black ink and to be printed in a first scanning direction, and a third group of scan data comprising data to be printed with ink other than black ink and to be printed in a second scanning direction opposite said first scanning direction; and processing each of the first, second, and third groups of scan data individually with a respective process specific to each group to obtain corrected scan data.

35. A method according to claim 34, wherein said scan data generated in said generating step are input density values of the image data.

36. A method according to claim 35, wherein said processing step obtains output density values based on the input density values.

37. A method according to claim 35, wherein said processing step obtains a number of ink droplets required to be printed in a target pixel based on the input density values.

38. A method according to claim 34, wherein said method is an output correction process for image data.

39. A computer-readable medium which stores computer-executable process steps for processing image data to be printed by a printer that prints an image on a recording medium by performing a plurality of printing scans, the computer-executable process steps comprising:

generating scan data for printing the image;

organizing the scan data into a first group of scan data comprising data to be printed with black ink, a second group of scan data comprising data to be printed with ink other than black ink and to be printed in a first scanning direction, and a third group of scan data comprising data to be printed with ink other than black ink and to be printed in a second scanning direction opposite said first scanning direction; and processing each of the first, second, and third groups of scan data individually with a respective process specific to each group to obtain corrected scan data.

40. A computer-readable medium according to claim 39, wherein said scan data generated in said generating step are input density values of the image data.

41. A computer-readable medium according to claim 40, wherein said processing step obtains output density values based on the input density values.

42. A computer-readable medium according to claim 40, wherein said processing step obtains a number of ink droplets required to be printed in a target pixel based on the input density values.

43. A computer-readable medium according to claim 39, wherein said computer-executable process steps are an output correction process for image data.

44. A print driver in which image data is processed to correct image density values, comprising:

generating scan data for printing an image;

organizing the scan data into a first group of scan data comprising data to be printed with black ink, a second group of scan data comprising data to be printed with ink other than black ink and to be printed in a first scanning direction, and a third group of scan data comprising data to be printed with ink other than black ink and to be printed in a direction opposite said first scanning direction; and processing each of the first, second, and third groups of scan data individually with a respective process specific to each group to obtain corrected scan data.

45. A print driver according to claim 44, wherein said scan data generated in said generating step are input density values of the image data.

46. A print driver according to claim 45, wherein said processing step obtains output density values based on the input density values.

47. A print driver according to claim 45, wherein said processing step obtains a number of ink droplets required to be printed in a target pixel based on the input density values.

48. A recording apparatus for printing data on a recording medium by performing a plurality of printing scans with a print head having ink ejection nozzles for ejecting ink of at least a first and a second color, comprising:

driving means for driving the print head across the recording medium and to eject at least the first color ink and/or the second color ink onto the recording medium; and control means for causing said driving means to eject the first color ink with a first power and the second color ink with a second power in a first printing scan by the print head, and causing said driving means to eject the second color ink with a third power larger than the second power in a second printing scan by the print head.

49. A recording apparatus according to claim 48, wherein said control means causes said driving means to eject the second color ink in a first quantity unit to each target pixel in the first printing scan, and causes said driving means to eject the second color ink in a second quantity unit greater than the first quantity unit to each target pixel in the second printing scan.

50. A recording apparatus according to claim 49, wherein said control means causes said driving means to eject the second color ink with a first pixel pattern in the first printing scan, and causes said driving means to eject the second color ink with a second pixel pattern in the second printing scan.

51. A recording apparatus according to claim 48, wherein said control means causes said driving means to eject the second color ink with a first frequency in the first printing scan, and causes said driving means to eject the second color ink with a second frequency greater than the first frequency in the second printing scan.

52. A recording apparatus according to claim 48, wherein said control means causes said driving means to eject the first color ink with a fourth power less than the first power in the second printing scan.

53. A recording method for printing data on a recording medium by performing a plurality of printing scans with a print head having ink ejection nozzles for ejecting ink of at least a first and a second color, the method comprising the steps of:

driving the print head across the recording medium to eject at least the first color ink and/or the second color ink onto the recording medium;

ejecting the first color ink with a first power and the second color ink with a second power in a first printing scan by the print head; and ejecting the second color ink with a third power larger than the second power in a second printing scan by the printing head.

54. A recording method according to claim 53, wherein the second color ink is ejected in a first quantity unit to each target pixel in the first printing scan, and the second color ink is ejected in a second quantity unit greater than the first quantity unit to each target pixel in the second printing scan.

55. A recording apparatus according to claim 54, wherein the second color ink is ejected with a first pixel pattern in the first printing scan, and the second color ink is ejected with a second pixel pattern in the second printing scan.

56. A recording method according to claim 53, wherein the second color ink is ejected with a first frequency in the first printing scan, and the second color ink is ejected with a second frequency greater than the first frequency in the second printing scan.

57. A recording apparatus according to claim 53, wherein the first color ink is ejected with a fourth power less than the first power in the second printing scan.

* * * * *